US011780684B2

(12) United States Patent
Wagner et al.

(10) Patent No.: US 11,780,684 B2
(45) Date of Patent: Oct. 10, 2023

(54) SYSTEMS AND METHODS FOR PROCESSING OBJECTS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 288 days.

(21) Appl. No.: 16/995,015

(22) Filed: Aug. 17, 2020

(65) Prior Publication Data
US 2020/0377308 A1 Dec. 3, 2020

Related U.S. Application Data

(63) Continuation of application No. 15/807,213, filed on Nov. 8, 2017, now Pat. No. 10,793,375.
(Continued)

(51) Int. Cl.
B65G 47/49 (2006.01)
G05B 19/418 (2006.01)
(Continued)

(52) U.S. Cl.
CPC ............. *B65G 47/49* (2013.01); *B65G 47/40* (2013.01); *B65G 47/82* (2013.01);
(Continued)

(58) Field of Classification Search
CPC ...... B65G 47/40; B65G 47/49; B65G 47/493; B65G 47/82; B65G 47/962;
(Continued)

(56) References Cited

U.S. PATENT DOCUMENTS 3,955,678 A * 5/1976 Moyer ................... B65G 47/50
209/583
4,722,653 A 2/1988 Williams et al.
(Continued)

FOREIGN PATENT DOCUMENTS

AU 2006204622 A1 3/2007
CN 1033604 A 7/1989
(Continued)

OTHER PUBLICATIONS

Final Office Action issued by the U.S. Patent and Trademark Office in related U.S. Appl. No. 15/807,213 dated Jan. 7, 2020, 14 pages.
(Continued)

*Primary Examiner* — Gene O Crawford
*Assistant Examiner* — Keith R Campbell
(74) *Attorney, Agent, or Firm* — Gesmer Updegrove LLP

(57) ABSTRACT

A processing system is disclosed for processing objects. The processing system includes a perception system for providing perception data regarding an object, and a primary transport system for providing transport of the object along
(Continued)

a primary direction toward a processing location that is identified based on the perception data.

76 Claims, 18 Drawing Sheets

Related U.S. Application Data

(60) Provisional application No. 62/418,973, filed on Nov. 8, 2016.

(51) Int. Cl.
  *B65G 47/40* (2006.01)
  *B65G 47/82* (2006.01)

(52) U.S. Cl.
  CPC ..... *G05B 19/4183* (2013.01); *G05B 19/4189* (2013.01); *B65G 2201/0285* (2013.01); *B65G 2203/041* (2013.01); *G05B 2219/36371* (2013.01); *G05B 2219/40078* (2013.01); *G05B 2219/45045* (2013.01); *G05B 2219/45047* (2013.01); *G05B 2219/45051* (2013.01); *G05B 2219/45054* (2013.01); *G05B 2219/45056* (2013.01); *Y02P 90/02* (2015.11)

(58) Field of Classification Search
  CPC .... B65G 2201/0285; B65G 2203/0216; B65G 2203/041; B07C 1/04; B07C 3/08–087; B07C 3/12; B07C 3/14; B07C 5/4312; G05B 19/4182; G05B 19/4183; G05B 19/4189; G05B 2219/36371; G05B 2219/40078; G05B 2219/45045; G05B 2219/45047; G05B 2219/45051; G05B 2219/45054; G05B 2219/45056; Y02B 90/02
  See application file for complete search history.

(56) References Cited

U.S. PATENT DOCUMENTS

| | | | |
|---|---|---|---|
| 4,819,784 A | 4/1989 | Sticht | |
| 4,846,335 A | 7/1989 | Hartlepp | |
| 4,895,242 A | 1/1990 | Michel | |
| 5,190,162 A | 3/1993 | Hartlepp | |
| 5,419,457 A | 5/1995 | Ross | |
| 5,460,271 A * | 10/1995 | Kenny | B65G 47/1492 |
| | | | 198/453 |
| 5,495,097 A | 2/1996 | Katz | |
| 5,628,408 A | 5/1997 | Planke et al. | |
| 5,794,788 A * | 8/1998 | Massen | B07C 5/3408 |
| | | | 209/580 |
| 5,839,566 A * | 11/1998 | Bonnet | B65G 47/965 |
| | | | 198/370.04 |
| 6,059,092 A | 5/2000 | Jerue | |
| 6,079,570 A | 6/2000 | Oppliger et al. | |
| 6,087,608 A | 7/2000 | Schlichter et al. | |
| 6,131,372 A | 10/2000 | Pruett | |
| 6,208,908 B1 | 3/2001 | Boyd et al. | |
| 6,246,023 B1 | 6/2001 | Kugle | |
| 6,323,452 B1 | 11/2001 | Bonnet | |
| 6,390,756 B1 | 5/2002 | Isaacs | |
| 6,505,093 B1 | 1/2003 | Thatcher et al. | |
| 6,579,053 B1 | 6/2003 | Grams | |
| 6,685,031 B2 | 2/2004 | Takizawa | |
| 6,688,459 B1 | 2/2004 | Bonham et al. | |
| 6,705,528 B2 | 3/2004 | Good et al. | |
| 6,762,382 B1 | 7/2004 | Danelski | |
| 6,897,395 B2 | 5/2005 | Shiibashi et al. | |
| 6,946,612 B2 | 9/2005 | Morikawa | |
| 7,728,244 B2 | 6/2010 | De Leo et al. | |
| 8,776,694 B2 | 7/2014 | Rosenwinkel et al. | |
| 8,811,722 B2 | 8/2014 | Perez Cortes et al. | |
| 8,952,284 B1 | 2/2015 | Wong et al. | |
| 8,972,049 B2 | 3/2015 | Tidhar et al. | |
| 8,997,438 B1 | 4/2015 | Fallas | |
| 9,102,336 B2 | 8/2015 | Rosenwinkel | |
| 9,227,323 B1 | 1/2016 | Konolige | |
| 9,346,083 B2 | 5/2016 | Stone | |
| 9,364,865 B2 | 6/2016 | Kim | |
| 9,481,518 B2 | 11/2016 | Neiser | |
| 9,498,798 B2 * | 11/2016 | Hellenbrand | B07C 5/00 |
| 9,555,447 B2 | 1/2017 | Lykkegaard et al. | |
| 9,694,977 B2 | 7/2017 | Aprea et al. | |
| 9,751,693 B1 | 9/2017 | Battles et al. | |
| 9,878,349 B2 * | 1/2018 | Crest | B07C 1/06 |
| 9,926,138 B1 | 3/2018 | Brazeau et al. | |
| 10,058,896 B2 * | 8/2018 | Hicham | B07C 1/04 |
| 10,906,188 B1 * | 2/2021 | Sun | B07C 5/36 |
| 2002/0092801 A1 | 7/2002 | Dominguez | |
| 2002/0170850 A1 | 11/2002 | Bonham et al. | |
| 2002/0179502 A1 | 12/2002 | Cerutti et al. | |
| 2003/0014376 A1 | 1/2003 | DeWitt et al. | |
| 2003/0038065 A1 | 2/2003 | Pippin et al. | |
| 2003/0042112 A1 | 3/2003 | Woerner et al. | |
| 2006/0070929 A1 | 4/2006 | Fry et al. | |
| 2011/0144798 A1 | 6/2011 | Freudelsperger | |
| 2011/0320036 A1 | 12/2011 | Freudelsperger | |
| 2012/0118699 A1 | 5/2012 | Buchmann et al. | |
| 2013/0051696 A1 | 2/2013 | Garrett et al. | |
| 2013/0110280 A1 | 5/2013 | Folk | |
| 2013/0144431 A1 | 6/2013 | Tidhar et al. | |
| 2013/0202195 A1 | 8/2013 | Perez Cortes et al. | |
| 2014/0166549 A1 | 6/2014 | Ito et al. | |
| 2014/0244026 A1 | 8/2014 | Neiser | |
| 2014/0291112 A1 | 10/2014 | Lyon et al. | |
| 2014/0364998 A1 | 12/2014 | Neiser et al. | |
| 2015/0081090 A1 | 3/2015 | Dong | |
| 2015/0306634 A1 | 10/2015 | Maeda et al. | |
| 2016/0199884 A1 | 7/2016 | Lykkegaard et al. | |
| 2016/0221762 A1 | 8/2016 | Schroader | |
| 2016/0221766 A1 | 8/2016 | Schroader et al. | |
| 2016/0228921 A1 * | 8/2016 | Doublet | B07C 5/342 |
| 2016/0347545 A1 | 12/2016 | Lindbo et al. | |
| 2017/0043953 A1 | 2/2017 | Battles et al. | |
| 2017/0121113 A1 | 5/2017 | Wagner et al. | |
| 2017/0157649 A1 | 6/2017 | Wagner et al. | |
| 2017/0173638 A1 | 6/2017 | Wagner et al. | |
| 2017/0157648 A1 | 7/2017 | Wagner et al. | |
| 2017/0225330 A1 | 8/2017 | Wagner et al. | |
| 2017/0349385 A1 | 12/2017 | Moroni et al. | |

FOREIGN PATENT DOCUMENTS

| | | |
|---|---|---|
| CN | 102390701 A | 3/2012 |
| CN | 104743367 A | 7/2015 |
| DE | 19510392 A1 | 9/1996 |
| DE | 102004001181 A1 | 8/2005 |
| DE | 102004013353 A1 | 10/2005 |
| DE | 102005061309 A1 | 7/2007 |
| DE | 102007023909 A1 | 11/2008 |
| DE | 102007028680 A1 | 12/2008 |
| DE | 102007038834 A1 | 2/2009 |
| DE | 102010002317 A1 | 8/2011 |
| DE | 102012102333 A1 | 9/2013 |
| DE | 102014111396 A1 | 2/2016 |
| EP | 0613841 A | 9/1994 |
| EP | 1695927 A2 | 8/2006 |
| EP | 1995192 A2 | 11/2008 |
| EP | 2233400 A1 | 9/2010 |
| EP | 2511653 A1 | 10/2012 |
| EP | 2823899 A1 | 1/2015 |
| EP | 3006379 A2 | 4/2016 |
| EP | 3112295 A1 | 1/2017 |
| FR | 1457450 A | 1/1966 |
| FR | 2832654 A1 | 5/2003 |
| GB | 2084531 A | 4/1982 |
| JP | S54131278 A | 10/1979 |
| JP | S63310406 A | 12/1988 |
| JP | 2002028577 A | 1/2002 |
| JP | 2007182286 A | 7/2007 |
| JP | 2008037567 A | 2/2008 |

(56) References Cited

FOREIGN PATENT DOCUMENTS

| | | |
|---|---|---|
| JP | 2014141313 A | 8/2014 |
| WO | 2005118436 A1 | 12/2005 |
| WO | 2007009136 A1 | 1/2007 |
| WO | 2010017872 A1 | 2/2010 |
| WO | 2010034044 A2 | 4/2010 |
| WO | 2010099873 A1 | 9/2010 |
| WO | 2011038442 A2 | 4/2011 |
| WO | 2012024714 A2 | 3/2012 |
| WO | 2014064592 A2 | 5/2014 |
| WO | 2014166650 A1 | 10/2014 |
| WO | 2015035300 A1 | 3/2015 |
| WO | 2015118171 A1 | 8/2015 |
| WO | 2015162390 A1 | 10/2015 |
| WO | 2016100235 A1 | 6/2016 |

OTHER PUBLICATIONS

Examiner's Report issued by the Innovation, Science and Economic Development Canada in related Canadian Patent Application No. 3,043,018 dated Jun. 26, 2020, 4 pages.
International Search Report issued by the International Searching Authority, the European Patent Office, dated Jan. 25, 2018 in related International Application No. PCT/US2017/060628, 4 pages.
International Preliminary Report on Patentability issued by the International Bureau of WIPO in related International Application No. PCT/US2017/060628 dated May 23, 2019, 9 pages.
Non-Final Office Action issued by the U.S. Patent and Trademark Office in related U.S. Appl. No. 15/807,213 dated May 1, 2019, 12 pages.
Communication pursuant to Rules 161(1) and 162 EPC issued by the European Patent Office dated Jun. 17, 2019 in related European Patent Application No. 17801817.2, 3 pages.
Examiner's Report issued by the Innovation, Science and Economic Development Canada (Canadian Intellectual Property Office) in related Canadian Patent Application No. 3,043,018 dated Mar. 22, 2022, 3 pages.
Communication pursuant to Article 94(3) EPC issued by the European Patent Office in related European Patent Application No. 17801817.2 dated Mar. 19, 2021, 5 pages.
First Office Action, along with its English translation, issued by the China National Intellectual Property Administration in related Chinese Patent Application No. 201780068968.X dated Oct. 8, 2021, 14 pages.
Second Office Action, along with its English translation, issued by the China National Intellectual Property Administration in related Chinese Patent Application No. 201780068968.X dated May 6, 2022, 12 pages.
Third Office Action, along with its English translation, issued by the China National Intellectual Property Administration in related Chinese Patent Application No. 201780068968.X dated Oct. 8, 2022, 23 pages.
Extended European Search Report issued by the European Patent Office in related European Patent Application No. 22214923.9 dated Apr. 3, 2023, 9 pages.
Decision on Rejection, along with its English translation, issued by the National Intellectual Property Administration, P.R.C in related Chinese Patent Application No. 201780068968.X dated Apr. 27, 2023, 11 pages.

* cited by examiner

SYSTEMS AND METHODS FOR PROCESSING OBJECTS

PRIORITY

The present application is a continuation of U.S. patent application Ser. No. 15/807,213, filed Nov. 8, 2017, now U.S. Pat. No. 10,793,375, issued Oct. 6, 2020, which claims priority to U.S. Provisional Patent Application Ser. No. 62/418,973, filed Nov. 8, 2016, the entire disclosures of which are hereby incorporated by reference in their entireties.

BACKGROUND

The invention generally relates to automated, robotic and other sortation and processing systems, and relates in particular to automated and robotic systems intended for use in environments requiring that a variety of parcels be sorted and/or distributed to several output destinations.

Many parcel distribution systems receive parcels in a disorganized stream that may be provided as individual parcels or parcels aggregated in groups such as in bags, arriving on any of several different conveyances, commonly a conveyor, a truck, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels has traditionally been done, at least in part, by human workers that scan the parcels, e.g., with a hand-held barcode scanner, and then place the parcels at assigned locations. For example many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these articles has traditionally been done by hand. A human sorter picks an article from an incoming bin, finds a barcode on the object, scans the barcode with a handheld barcode scanner, determines from the scanned barcode the appropriate bin or shelf location for the article, and then places the article in the so-determined bin or shelf location where all articles for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying items by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the article and places it in front of the scanner so that the barcode faces the scanning device's sensors, and the scanner, which scans continuously, decodes any barcodes that it can detect. If the article is not immediately detected, the person holding the article typically needs to vary the position or rotation of the object in front of the fixed scanner, so as to make the barcode more visible to the scanner. For handheld systems, the person operating the scanner looks for the barcode on the article, and then holds the scanner so that the article's barcode is visible to the scanner, and then presses a button on the handheld scanner to initiate a scan of the barcode.

Further, many current distribution center sorting systems generally assume an inflexible sequence of operations whereby a disorganized stream of input objects is first singulated into a single stream of isolated objects presented one at a time to a scanner that identifies the object. An induction element or elements (e.g., a conveyor, a tilt tray, or manually movable bins) transport the objects to the desired destination or further processing station, which may be a bin, a chute, a bag or a conveyor etc.

In conventional parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Other systems that include tilt trays may involve scanning an object (e.g., using a tunnel scanner), dropping the object into a tilt tray, associating the object with the specific tilt tray using a known location or position, for example, using beam breaks, and then causing the tilt tray to drop the object when it is at the desired location.

Further, partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; the trays then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bin designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a processing system for processing objects. The processing system includes a perception system for providing perception data regarding an object, and a primary transport system for providing transport of the object along a primary direction toward a processing location that is identified based on the perception data.

In accordance with another embodiment, the invention provides a system for providing processing of objects. The system includes a singulation system for providing a singulated stream of objects, and a perception system for receiving the singulated stream of objects, and for generating perception data for providing processing of the objects.

In accordance with another embodiment, the invention provides a method of providing processing of objects. The method includes the steps of providing perception data regarding an object, and transporting the object along a primary direction toward a processing location that is identified based on the perception data.

In accordance with a further embodiment, the invention provides a method of providing processing of objects. The method includes the steps of providing a singulated stream of objects, providing perception data regarding an object, transporting the object along a primary direction toward a processing location that is identified based on the perception data, and transporting the object from the primary direction into one of at least two secondary directions based on the perception data.

BRIEF DESCRIPTION OF THE DRAWINGS

The following description may be further understood with reference to the accompanying drawings in which.

Figure 1:
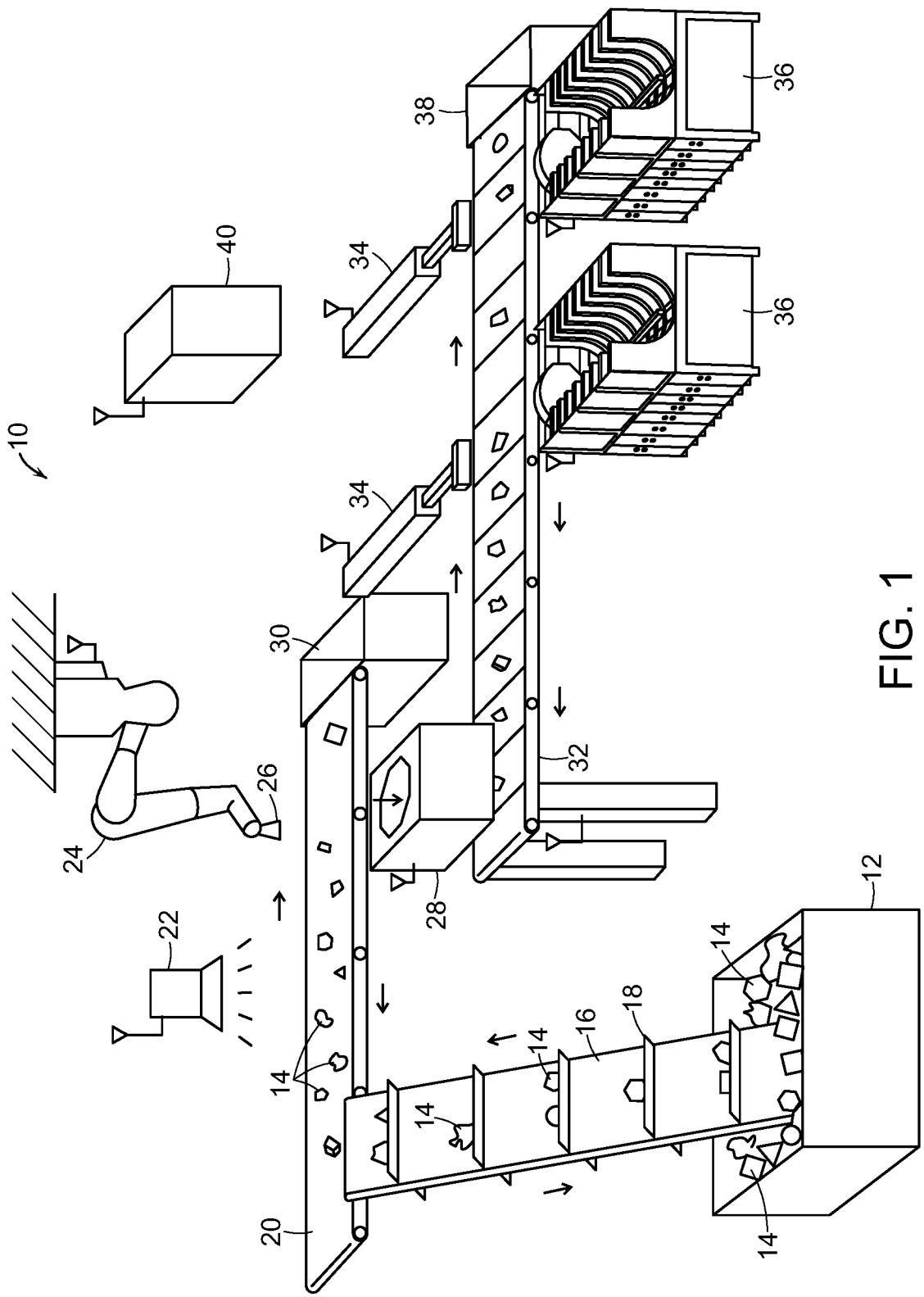
FIG. 1 shows an illustrative diagrammatic view of a system in accordance with an embodiment of the present invention.

The drawings are shown for illustrative purposes only.

DETAILED DESCRIPTION

In accordance with an embodiment, the invention provides a processing (e.g., sortation) system that includes an input system, a singulation system, an identification system, and an output system, for the purpose of automatically processing a stream of incoming parcels and sorting them to the desired output destinations. Individual parcels need to be identified and conveyed to desired parcel-specific locations. The described systems reliably automate the identification and conveyance of such parcels, employing in certain embodiments, a set of conveyors and sensors and a robot arm. In short, applicants have discovered that when automating the sortation of objects, there are a few main things to consider: 1) the overall system throughput (parcels sorted per hour), 2) the number of diverts (i.e., number of discrete locations to which an object can be routed), 3) the total area of the sortation system (square feet), 4) sort accuracy, and 5) the capital and annual costs to purchase and run the system.

Sorting objects in a distribution center is one application for automatically identifying and sorting parcels. In a shipping distribution center, parcels commonly arrive in trucks, totes, Gaylords or other vessels for delivery, are conveyed to sortation stations where they are sorted according to desired destinations, aggregated in bags, and then loaded in trucks for transport to the desired destinations. Another application would be in the shipping department of a retail store or order fulfillment center, which may require that parcels be sorted for transport to different shippers, or to different distribution centers of a particular shipper. In a shipping or distribution center the parcels may take form of plastic bags, boxes, tubes, envelopes, or any other suitable container, and in some cases may also include objects not in a container. In a shipping or distribution center the desired destination is commonly obtained by reading identifying information printed on the parcel or on an attached label. In this scenario the destination corresponding to identifying information is commonly obtained by querying the customer's information system. In other scenarios the destination may be written directly on the parcel, or may be known through other means.

In accordance with various embodiments, therefore, the invention provides a method of taking individual parcels from a disorganized stream of parcels, identifying individual parcels, and sorting them to desired destinations. The invention further provides methods for loading parcels into the system, for conveying parcels from one point to the next, for excluding inappropriate or unidentifiable parcels, for grasping parcels, for determining grasp locations, for determining robot motion trajectories, for transferring parcels from one conveyor to another, for aggregating parcels and transferring to output conveyors, for digital communication within the system and with outside information systems, for communication with human operators and maintenance staff, and for maintaining a safe environment.

Important components of an automated parcel identification and sortation system, in accordance with an embodiment of the present invention, are shown in FIG. 1. FIG. 1 shows a system 10 that includes an infeed hopper 12 into which objects 14 may be dumped, e.g., by a dumper or Gaylord. An infeed conveyor 16 conveys objects from the infeed hopper 12 to primary conveyor 20. The infeed conveyor 16 may include baffles 18 or cleats for assisting in lifting the objects 14 from the hopper 12 onto a primary conveyor 20. Primary perception system 22 surveys the objects 14 to identify objects when possible and to determine good grasp points. Robot arm 24 with gripper 26 grips objects and drops them over a secondary perception system 28 (for example, a drop scanner). Objects that cannot be grasped or are otherwise unacceptable continue along primary conveyor 20 and fall into primary exception bin 30.

Figure 2:
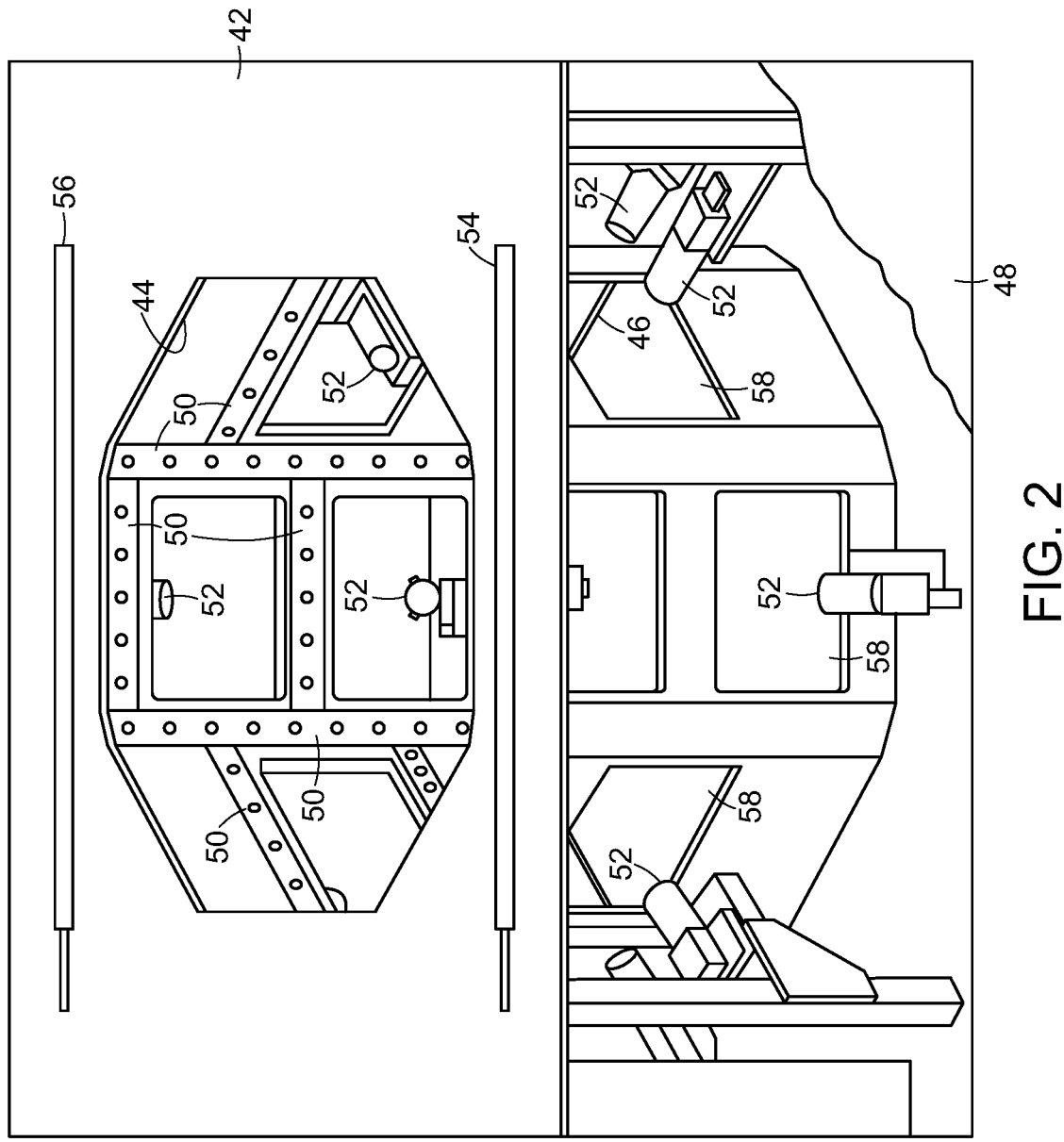
FIG. 2 shows an illustrative diagrammatic view of a front view of the drop scanner unit in the system shown in FIG. 1.
Figure 3:
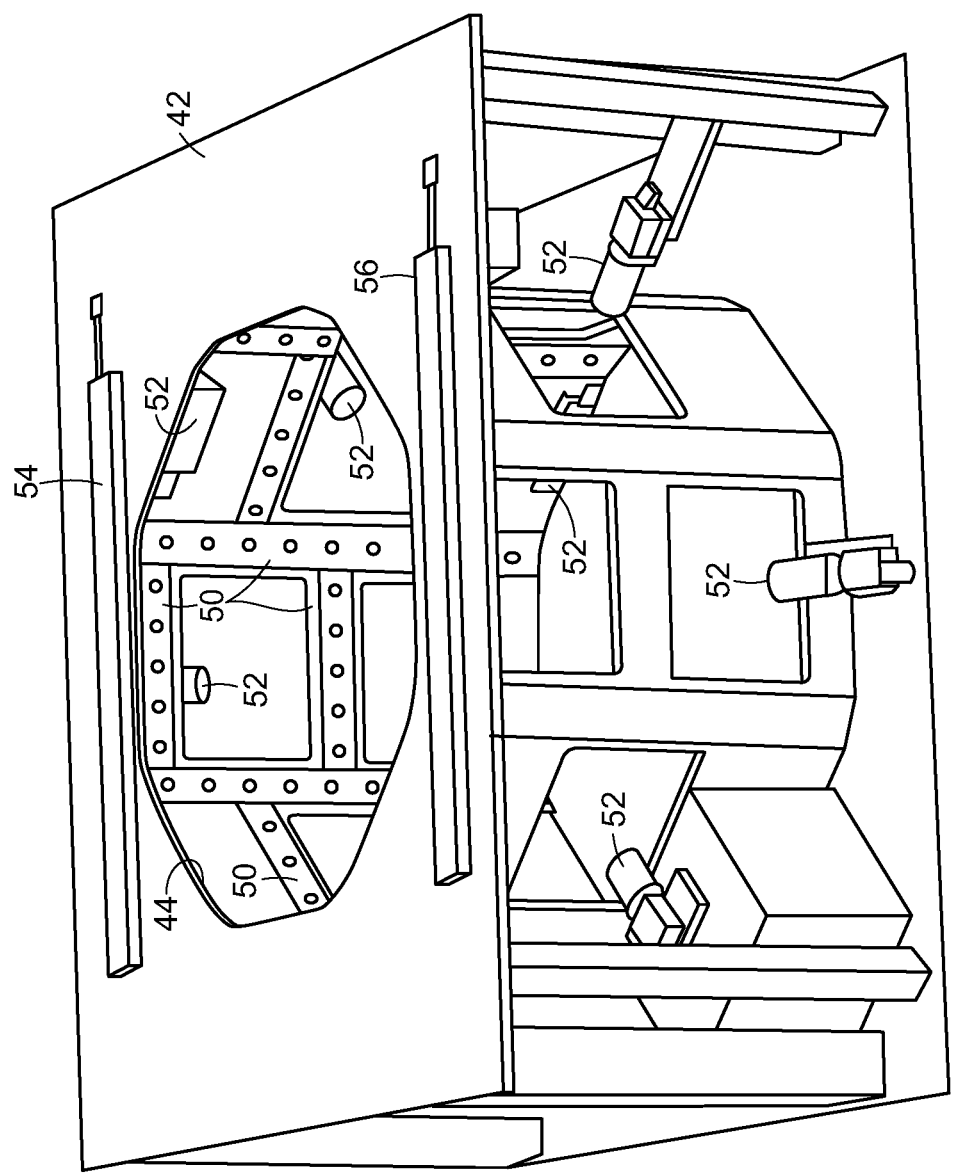
FIG. 3 shows an illustrative diagrammatic view of a back view of the drop scanner unit shown in FIG. 1.

The secondary perception 28, as well as the primary perception system 22, may be supported by any known means, e.g., by stands or may be suspended from above. As further shown in FIGS. 2 and 3, the secondary perception system 28 may include a structure 42 having a top opening 44 and a bottom opening 46, and may be covered by an enclosing material 48, e.g., a colored covering such as orange plastic, to protect humans from potentially dangerously bright lights within the secondary perception system. The structure 42 includes a plurality of rows of sources (e.g., illumination sources such as LEDs) 50 as well as a plurality of image perception units (e.g., cameras) 52. The sources 50 are provided in rows, and each is directed toward the center of the opening. The perception units 52 are also generally directed toward the opening, although some cameras are directed horizontally, while others are directed upward, and some are directed downward. The system 28 also includes an entry source (e.g., infrared source) 54 as well as an entry detector (e.g., infrared detector) 56 for detecting when an object has entered the perception system 28. The LEDs and cameras therefore encircle the inside of the structure 42, and the cameras are positioned to view the interior via windows that may include a glass or plastic covering (e.g., 58).

An important aspect of systems of certain embodiments of the present invention, is the ability to identify via barcode or other visual markings (e.g., as shown at 15 in FIG. 6 and at 210 in FIG. 18) of objects by employing a perception system into which objects may be dropped. Automated scanning systems would be unable to see barcodes on objects that are presented in a way that their barcodes are not exposed or visible. The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with a particular code or other processing indicia, e.g., a universal product code (UPC) such as shown at 15 in FIG. 6, that identifies the object, or a mail label that identifies a desired destination such as shown at 210 in FIG. 18.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor.

The manner in which outbound objects are organized is such that objects are placed in a bin, shelf location or cubby, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from the identifying code or processing indicia.

It is assumed that the objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D barcode symbologies. Multiple symbologies or labeling approaches may be employed. The types of scanners employed are assumed to be compatible with the marking approach. The marking, e.g., by barcode, RFID tag, mailing label or other means, encodes a symbol string, which is typically a string of letters and numbers. The symbol string uniquely associates the object with a set of processing instructions.

The operations of the systems described above are coordinated by the central control system 40 as shown in FIG. 1, 8-11 and 17. This system determines from symbol strings the UPC associated with an object, as well as the outbound destination for the object. The central control system is comprised of one or more workstations or central processing units (CPUs). For example, the correspondence between UPCs or mailing labels, and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. The robotic system may pick one item at a time from the input bin, and may drop each item into the perception system discussed above. If the perception system successfully recognizes a marking on the object, then the object is then identified and forwarded to a sorting station or other processing station. If the object is not identified, the robotic system may either replace the object back onto the input conveyor and try again, or the conveyor may divert the object to a human sortation bin to be reviewed by a human.

The sequence of locations and orientations of the perception units 52 are chosen so as to minimize the average or maximum amount of time that scanning takes, as well as to maximize the probability of successful scans. Again, if the object cannot be identified, the object may be transferred to a special outbound destination for unidentified objects, or it may be returned to the inbound stream. This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive in inbound bins and that need to be placed into a shelf of outbound bins, where sorting is to be based on a unique identifier symbol. Key specializations in this embodiment are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of barcode labeling. Parameters of the optimization for a barcode system include how many barcode scanners, where and in what orientation to place them, and what sensor resolutions and fields of view for the scanners to use. Optimization can be done through trial and error, or by simulation with models of the object.

Optimization through simulation employs a barcode scanner performance model. A barcode scanner performance model is the range of positions, orientations and barcode element size that a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

Typical performance for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the scanner, the barcode symbol pose model is itself a combination of an article gripping model, which predicts how objects will be held by the robotic system, as well as a barcode-item appearance model, which describes the possible placements of the barcode symbol on the object. For the scanner, the barcode symbol pose model is itself a combination of the barcode-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distribution over the sphere as a barcode-item appearance model.

With reference again to FIG. 1, objects 14 passing through the secondary perception unit 28 fall onto secondary conveyor 32. Diverters 34 divert objects to shuttle sections 36 as appropriate. While only two such diverters and shuttle sections are shown, any number of such diverters and shuttle sections may be used. Unidentified objects or otherwise unacceptable objects continue along secondary conveyor 32 and fall into secondary exception bin 38. The diverters 34 are in communication with the controller 40, which is in communication with the scanner 28 as well as the indexing position of the conveyor 32. Once an object falls through the scanner and lands of the conveyor, the system notes the conveyor position of the object. The scanner information is processed, and the object (if identified) is associated with that conveyor location, and its processing location is identified (as discussed in more detail below). As the conveyor advances, the system will know when the object is in the line of activation of a selected diverter, and will activate the diverter to push the object into the appropriate carriage. The carriage then moves the object to the assigned bin as discussed in more detail below. In various embodiments, the diverters may push an object off through various other ways, such as using a robot or a diverting guide, and in further embodiments, the diverters may pull an object off of the conveyor.

Figure 4:
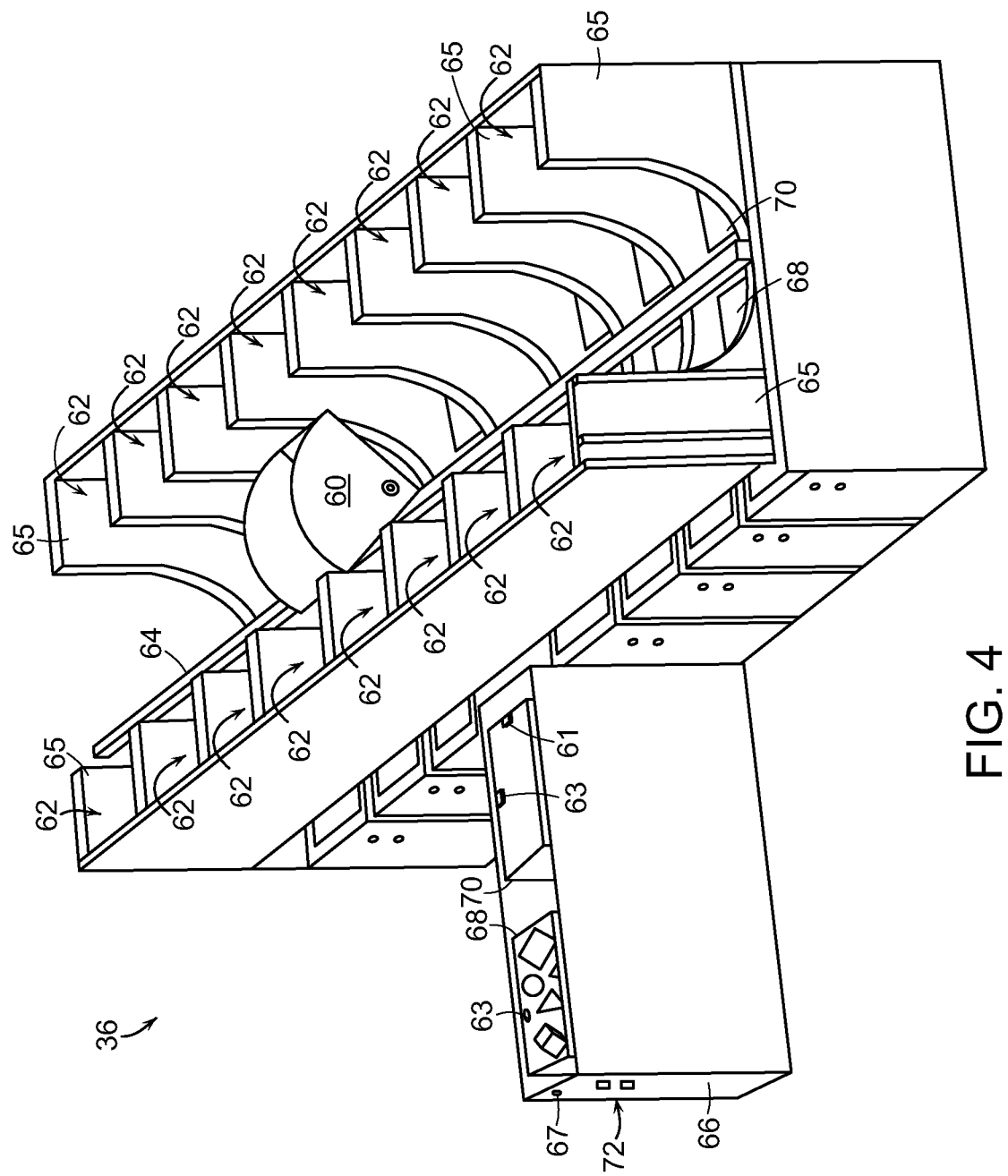
FIG. 4 shows an illustrative diagrammatic view of a shuttle section in the system shown in FIG. 1.
Figure 5:
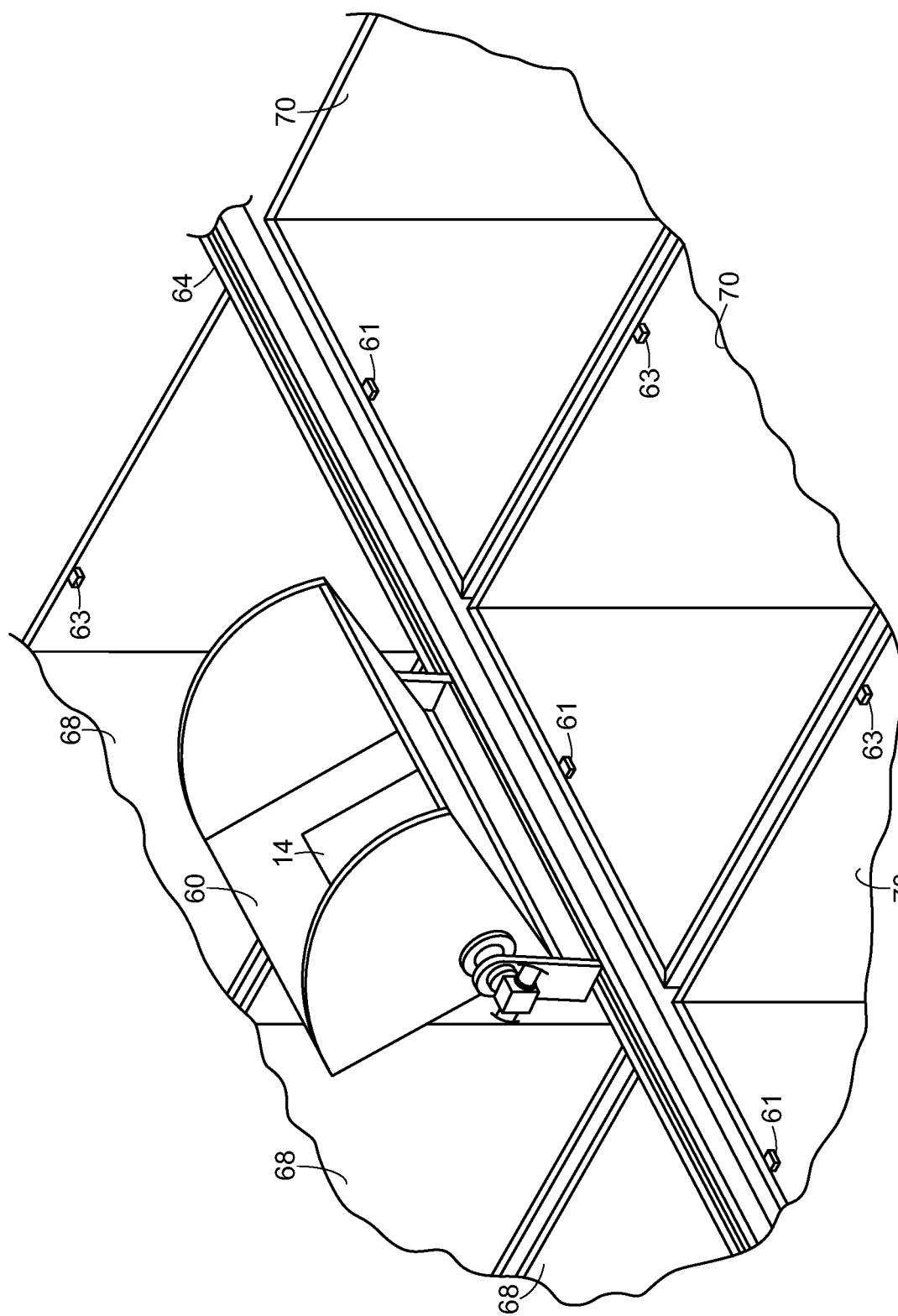
FIG. 5 shows an illustrative diagrammatic view of the carriage on the track adjacent bins in the shuttle section shown in FIG. 4.
Figure 6:
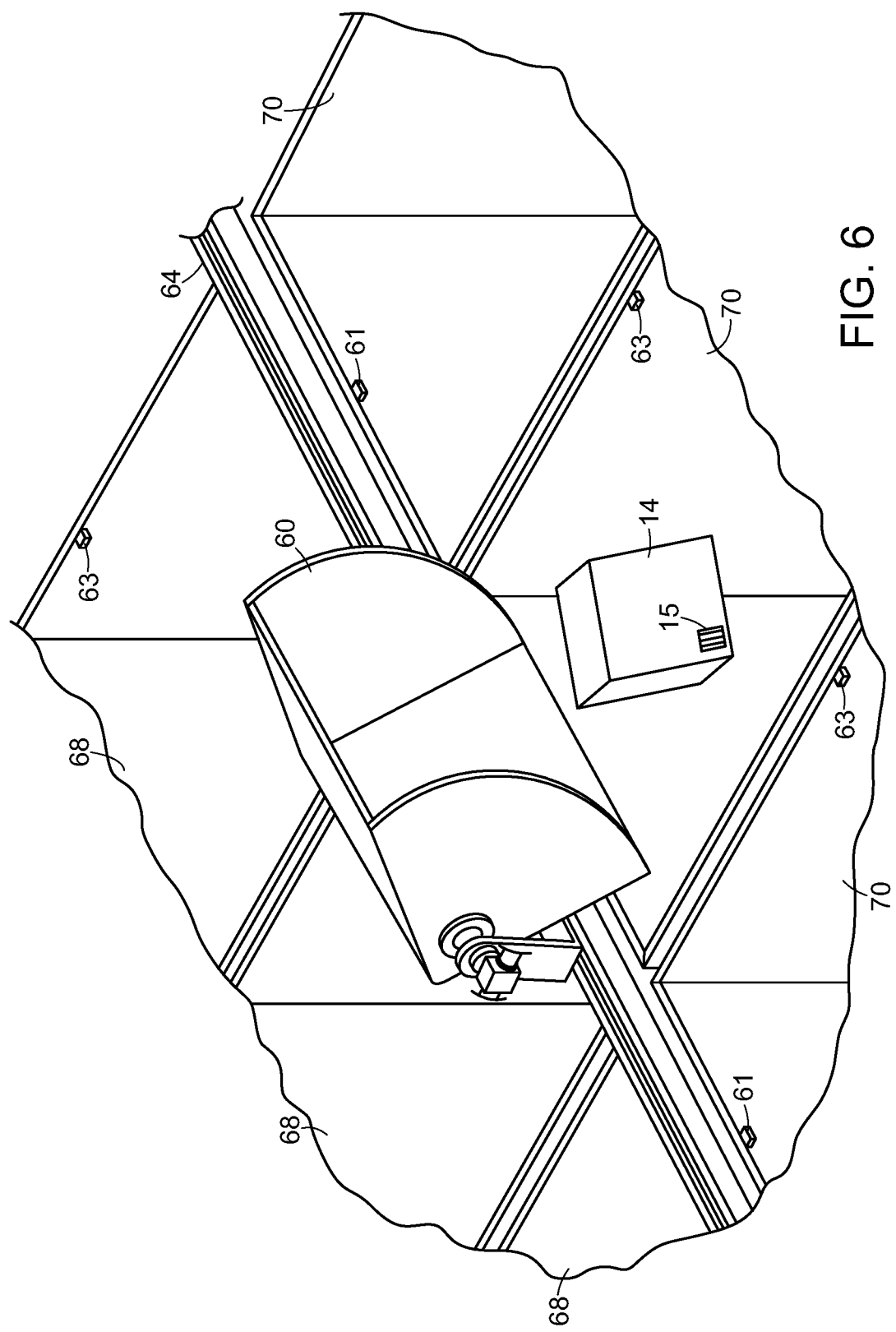
FIG. 6 shows an illustrative diagrammatic view of the carriage dropping its contents into a bin in the shuttle section shown in FIG. 4.
Figure 7:
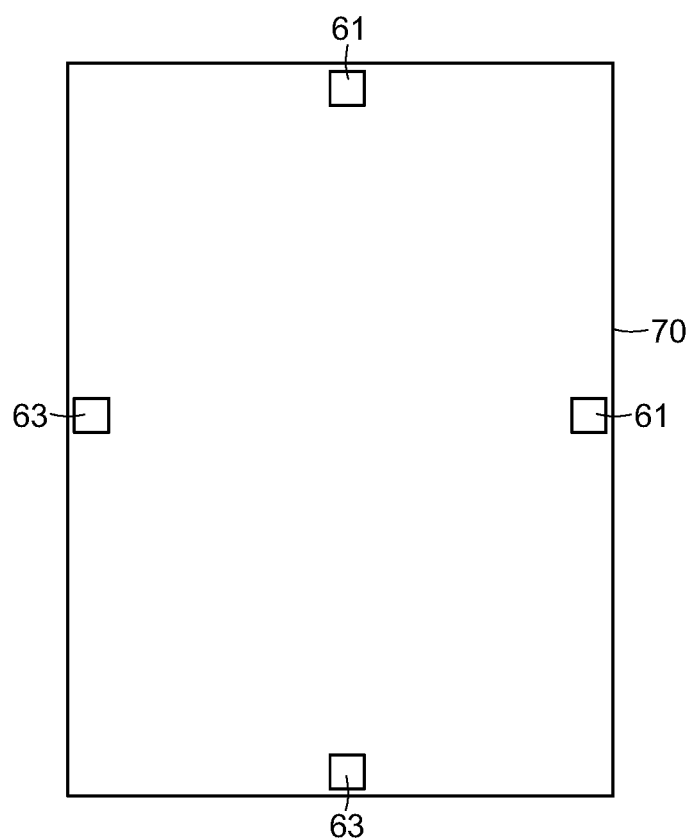
FIG. 7 shows an illustrative diagrammatic top view of a bin in the shuttle section shown in FIG. 4.

As further shown with reference to FIG. 4, each shuttle section 36 incudes a carriage 60 that shuttles back and forth between destination chutes 62 that include guide walls 65 that lead to two rows of bins 68, 70 on either side of a track 64. As further shown in FIGS. 5 and 6 (with the guide walls 65 removed for clarity), the carriage 60 travels along the track 64 and carries objects to a desired destination bin 68, 70, and tilts, dropping the object 14 into the desired destination bin as shown in FIG. 6. The guide walls serve to guide the object as it falls so that the object does not accidently drop into a neighboring bin. As further shown in FIG. 7, each bin (68 or 70) may include one or more pairs of emitters 61 and sensors 63 at the top of the bin. Output from a sensor 63 that is representative of a prolonged interruption from the associated source, may be used to determine that the bin is full.

Again, a central computing and control station 40 communicates with other computers distributed in the other components, and also communicates with the customer information system, provides a user interface, and coordinates all processes. As further shown in FIG. 4, each processing bin 62 of each shuttle section 36 may include a pull out drawer 66 from which each of the two opposing processing bins (e.g., 68, 70) may be accessed and emptied. Each pull-out drawer 66 may also include light indicators 72 to indicate when the processing bin (e.g., 68) is either full or is ready to be emptied based on system heuristics, e.g., that the bin is statistically unlikely to receive another object soon. In other embodiments, such lights may be positioned above the respective bin. Each drawer may also include a lock 67 that a person must unlock to pull out the drawer 66. The lock includes sensors that communicate with the controller 40, and when a drawer is unlocked, the system knows not to sort to either bin in the unlocked drawer. This way, the system may continue operating while drawers are pulled and bins are emptied.

Figure 8:
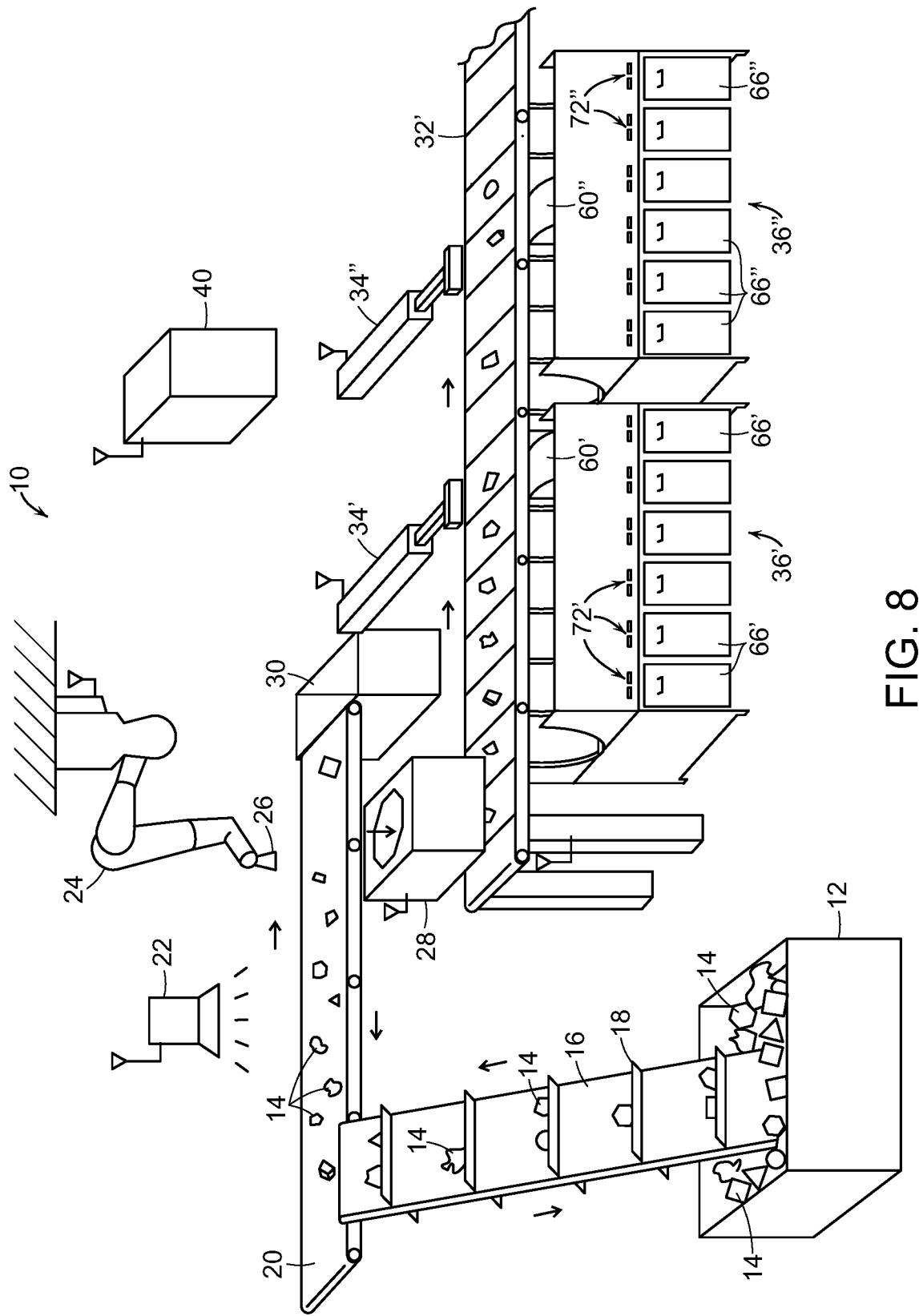
FIG. 8 shows an illustrative diagrammatic view of system in accordance with another embodiment of the present invention similar to that shown in FIG. 1, with the shuttle sections in different orientations.

FIG. 8 shows a system 100' similar to that shown in FIG. 1 (where the identical components have the same reference numbers), except that the shuttle sections 36' of FIG. 8 are positioned alongside (parallel with) the conveyor 32'. In particular, a first diverter 34' may push an object into a carriage 60' at one end of a shuttle section 36', while a second diverter 34" may push an object into a carriage 60" in the middle of a shuttle section 36". In accordance with further embodiments, many different arrangements are possible, and each is within the spirit and scope of the present invention. Each drawer 66' and 66" may lock as discussed above, and the indicator lights 72', 72" may be located above the drawers 66', 66".

Similarly, the diverters 34', 34" are in communication with the controller 40, which is in communication with the scanner 28 as well as the indexing position of the conveyor 32'. Again, in various embodiments, the diverters may push an object off through various other ways, such as using a robot or a diverting guide, and in further embodiments, the diverters may pull an object off of the conveyor. Once an object falls through the scanner and lands off the conveyor, the system notes the conveyor position of the object. The scanner information is processed, and the object (if identified) is associated with that conveyor location, and its processing location is identified (as discussed in more detail below). Again, as the conveyor advances, the system will know when the object is in the line of activation of a selected diverter, and will activate the diverter to push the object into the appropriate carriage. The carriage then moves the object to the assigned bin as discussed in more detail below.

Figure 9:
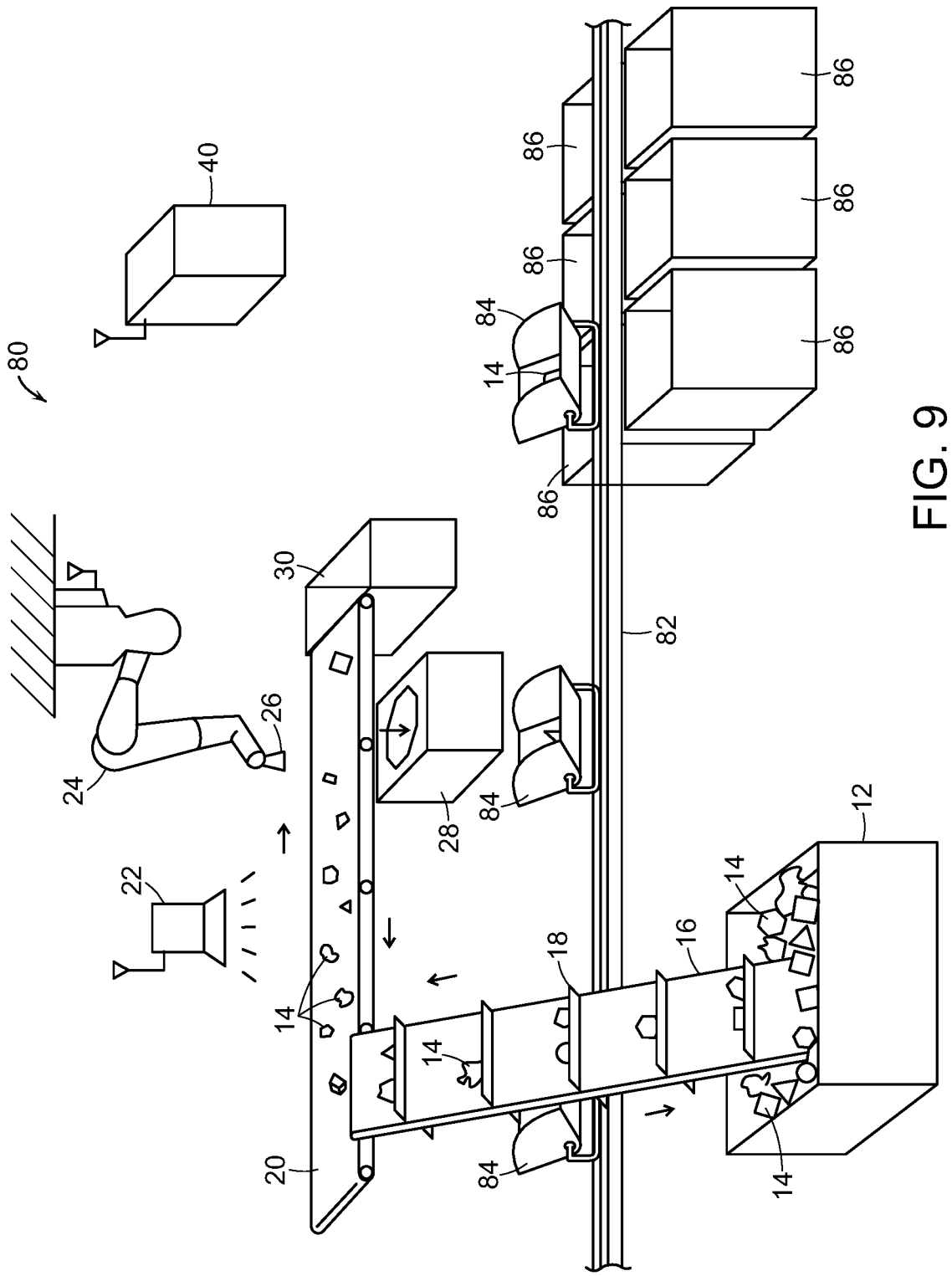
FIG. 9 shows an illustrative diagrammatic view of system in accordance with another embodiment of the present invention that includes carriages for receiving object from the drop scanner.

In accordance with further embodiments of the invention and as shown in FIG. 9, a system 80 may include a track 82 along which carriages 84 may travel in one direction toward a plurality of processing bins 86. The remaining items of the system 80 having reference numerals in common with the system of FIG. 1 are the same as those of the system of FIG. 1. Each carriage 84 may be dynamically programmed to dump its contained object 14 into an assigned processing bin 86 based on an assigned sortation scheme.

Figure 10:
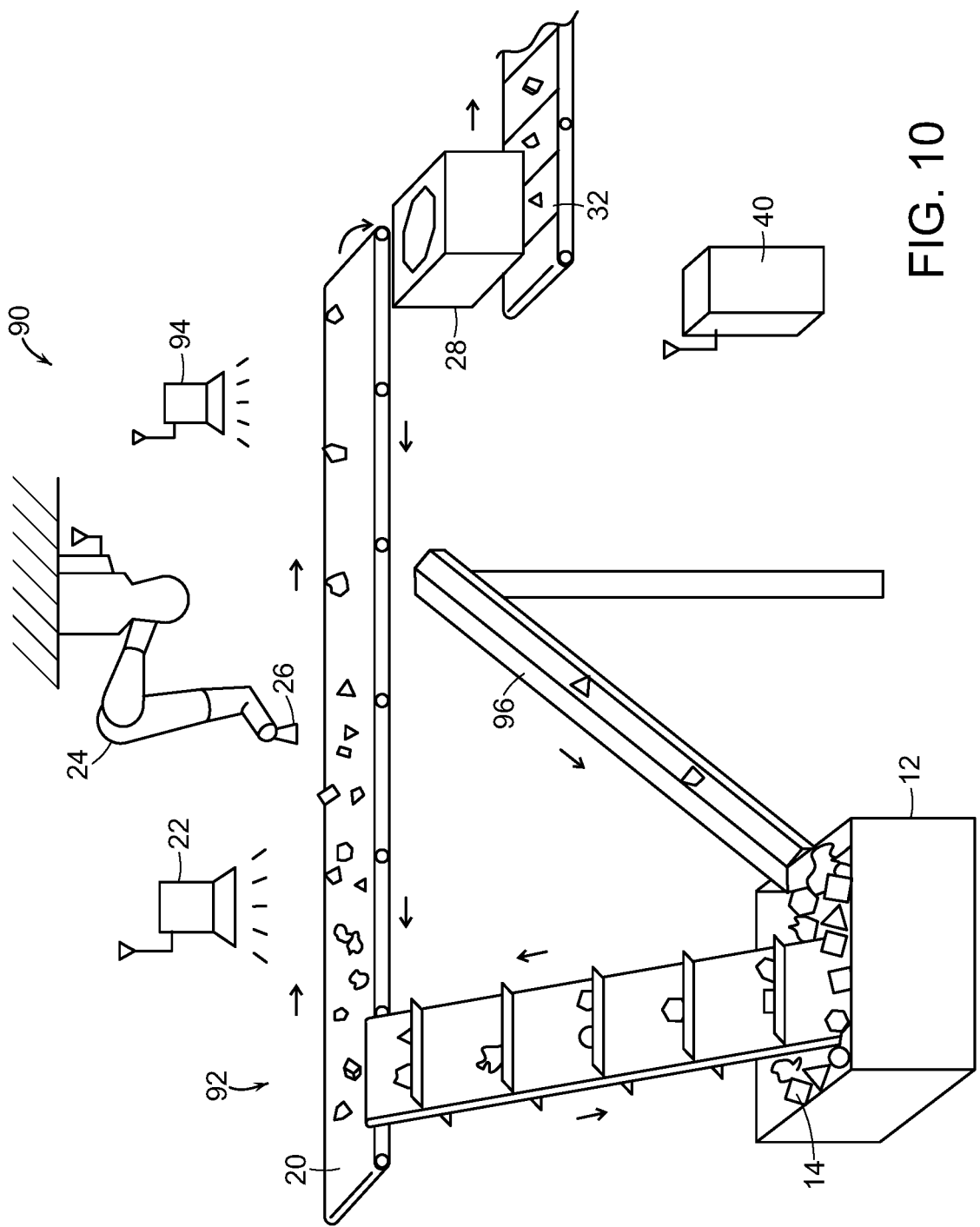
FIG. 10 shows an illustrative diagrammatic view of system in accordance with a further embodiment of the present invention that includes a return chute for returning selected objects to an input area.

In accordance with a further embodiment of the present invention and as shown in FIG. 10, a system 90 may provide that a portion of the input stream 92 is selectively adjusted by the robotic arm 24 to provide a singlated stream of objects (as may be detected and confirmed by a perception unit 94). In particular objects are identified by the primary perception unit 22 as being selected for removal (simply to provide a singulated stream of objects), and the robotic arm 24 is engaged to selectively remove objects from the input stream to create the singulated stream of objects. In further embodiments, diverters as discussed above may be used for this purpose. The removed objects are placed by the robotic arm onto a return chute 96 that returns the selected objects to the input bin 12. Such recirculation is for the purpose of providing the singulated stream of objects. Significantly, a singulated stream of objects is provided (as shown at 92), and this singulated stream of objects may be delivered to a perception unit 28 (as discussed above) as a singulated stream without requiring that a robotic system place objects into the perception unit 28. If an object is not identified or is otherwise not able to be processed, it may fall to an exception bin 38 as discussed above, and be returned to a recirculation area or hand processed by a person.

Figure 11:
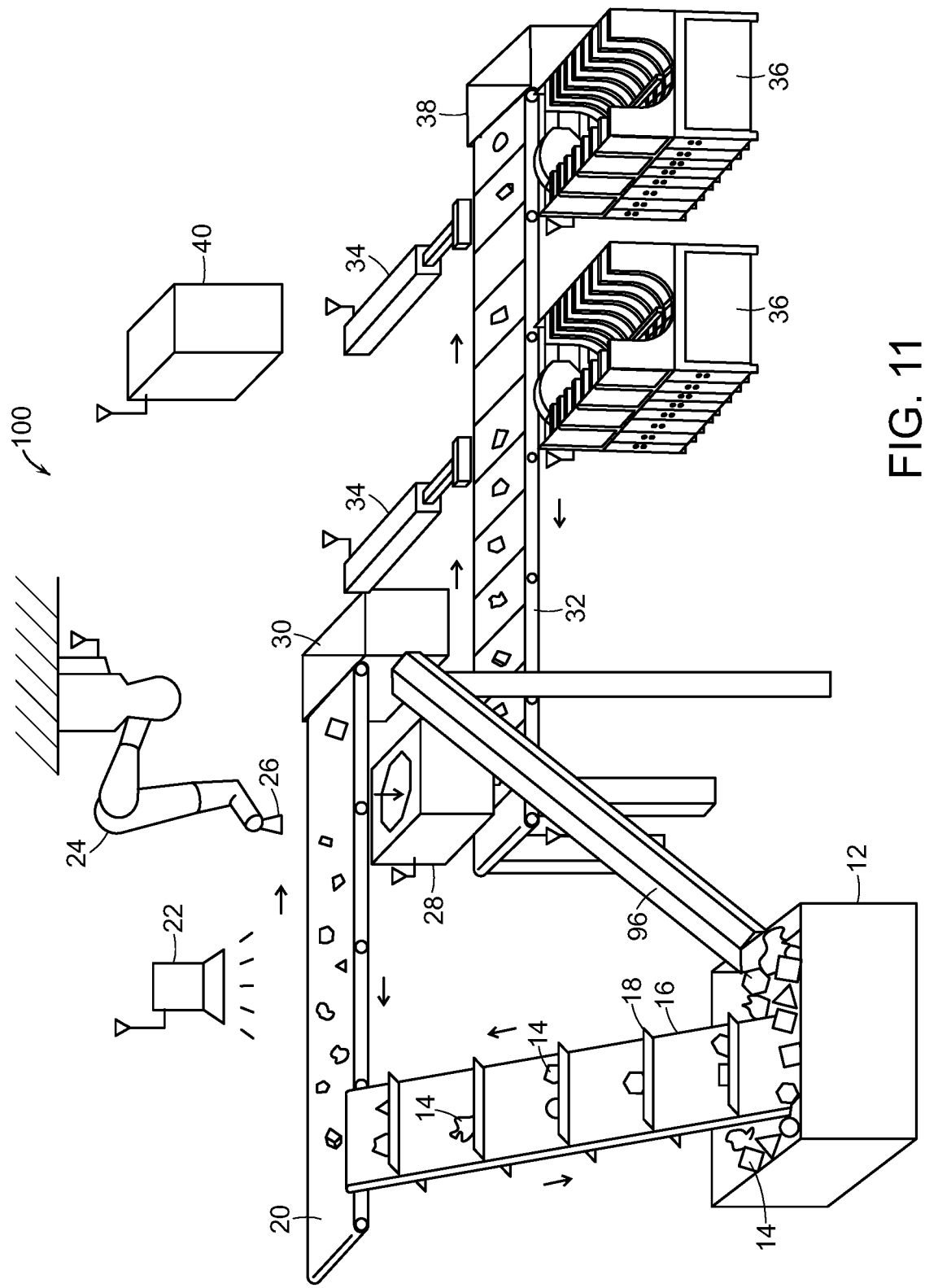
FIG. 11 shows an illustrative diagrammatic view of a system in accordance with a further embodiment of the present invention that includes a return chute and shuttle sections.

The assignment of processing bins may also be dynamic. For example, systems in accordance with further embodiments, provide improved transport and conveyor systems, and provide programmable robotic manipulators in particular, that allow dynamically changing patterns of object handling, with resulting efficiencies in the sortation process, lower space requirements, lower demand for manual operations, and as a consequence, lower capital and operating costs for the entire system. FIG. 11 shows a system 100 similar to the system of FIG. 1 (using the same reference numerals as used in FIG. 1 to identify the same items. The system 100 further includes a return chute 96 (as in the system 90 of FIG. 10) that returns selected items to the input hopper 12 to provide the singulated stream of objects.

During use, the sorting station may select an object and then identify the selected object by the perception system 22 (or may detect an identity of an object using a scanner on the articulated arm, or may use the robotic arm to move the object to a detection device). In further embodiments, the robotic arm may even hold an object in the perception system 28 for object identification only. If the object has an assigned bin or a new bin is available, then the end effector will drop the object through the perception system; otherwise the robotic arm will pull the object from the perception system 28 and place it on the return chute 96. The system assigns a bin to the object if a new bin is available and the object is not yet assigned a bin at that sorting station. What is significant is that the sorting station is not pre-assigned a large set of collection bins assigned to all possible objects that may appear in the input path. Further, the central controller may employ a wide variety of heuristics that may further shape the process of dynamically assigning objects to collection bins as discussed in more detail below. Once bins are either filled or otherwise completed, the completed bins are signaled as being done and ready for further processing (e.g., by lights 72 associated with bin 68 in FIG. 4).

Figure 12:
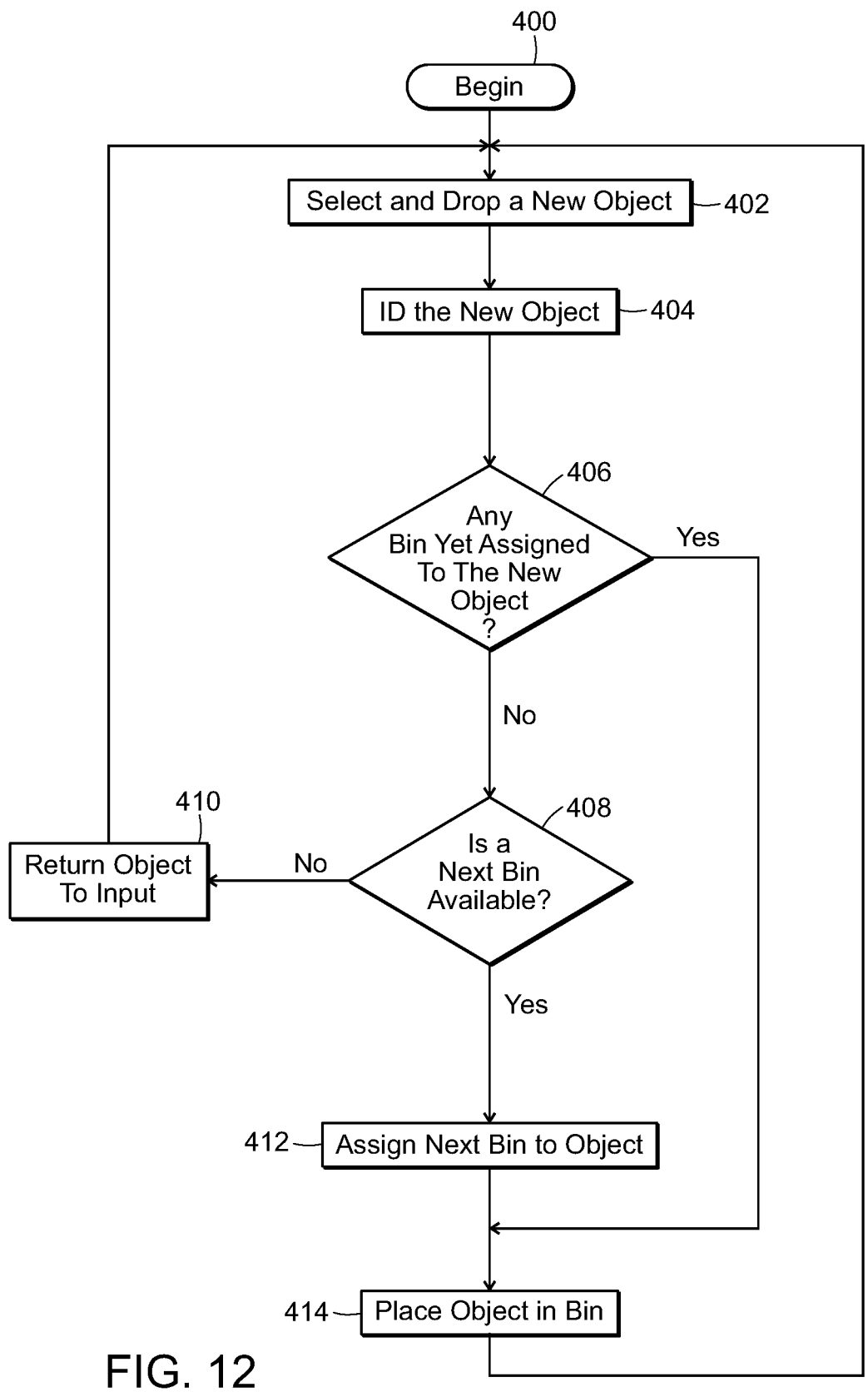
FIG. 12 shows an illustrative diagrammatic view of a flowchart showing selected processing steps in a system in accordance with an embodiment of the present invention.

As shown in FIG. 12, a sortation process of the invention at a sorting station may begin (step 400) by having a robotic system select a new object from the input stream and drop the new object into the drop scanner (step 402). The system then identifies the new object (step 404). The system then will determine whether the object is yet assigned to any collection bin (step 406). If not, the system will determine whether a next bin is available (step 408). If no next bin is available (step 410), the robotic system will return the object to the input buffer (step 410) and return to step 402. Alternatively, the system can pick one of the collection bins that is in process and decide that it can be emptied to be reused for the object in hand, at which point the control system can empty the collection bin or signal a human worker to do so. If a next bin is available (and the system may permit any number of bins per station), the system will then assign the object to a next bin (step 412). The system then places the object into the assigned bin (step 414). The system then returns to step 402 until finished. Again, in certain embodiments, the secondary conveyor may be an indexed conveyor that moves in increments each time an object is dropped onto the conveyor. The system may then register the identity of the object, access a warehouse manifest, and determine an assigned bin location or assign a new bin location.

Figure 13:
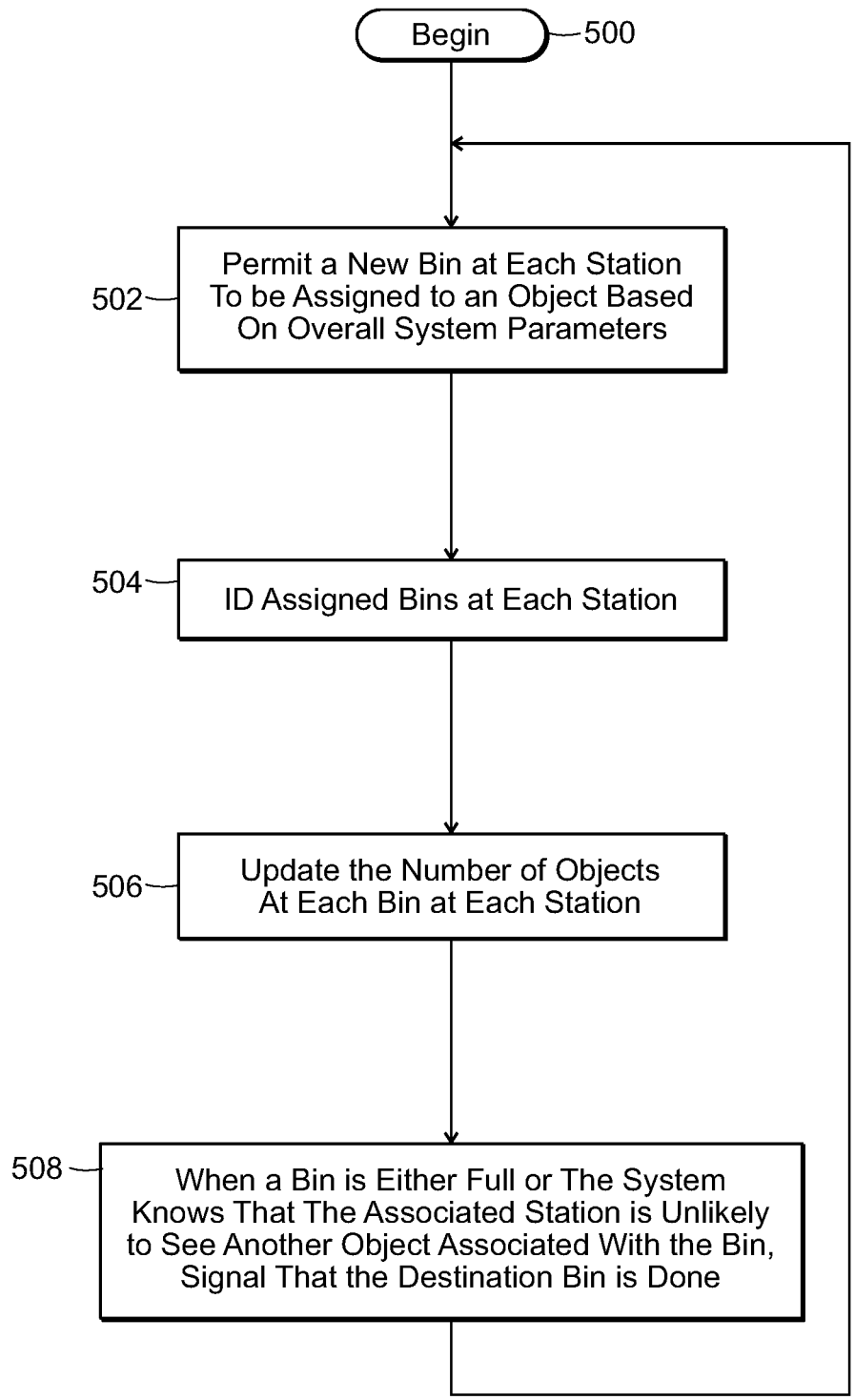
FIG. 13 shows an illustrative diagrammatic view of a flowchart showing bin assignment and management steps in a system in accordance with an embodiment of the present invention.

A process of the overall control system is shown, for example, in FIG. 13. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

In accordance with certain embodiments, therefore, the system provides a sortation system that employs a buffer at the infeed stage enabling scalable and flexible induction of objects into the system. The buffer may include a single conveyor, a circulating conveyor or multiple conveyors, possibly to separate disorganized objects from organized objects. In further embodiments, the invention provides a sortation system employing a plurality of sorters flexibly connected to both upstream and downstream processes. The system may also employ a flexible destination stage, including a process for dynamically changing the correspondence of sorter outputs and system destinations using a switch based on heuristics from the sortation process. The system may dynamically map sorter outputs to system destinations based on long-term historical usage trends and statistics, or items already processed, or current contents of other dynamically allocated sorter outputs, or average, minimum or maximum time-to-sort associated with each sorter output, or physical characteristics of the items sorted, or apriori information, or known future deliveries, or location within a facility, including the physical location relative to other allocated sorter outputs (e.g., above, beside, on or nearby), or incoming shipments, as well as knowing what items are currently upstream of the sortation process and combinations of the above. Further, systems of embodiments of the invention provide that information regarding correspondence between sorter outputs to system destinations may be provided to an automated system for sorting.

By making use of heuristics, the mapping of sorter outputs to system destinations can be improved substantially over traditional fixed allocation. Destinations may be assigned on the fly, reducing wasted space from unused sorter outputs and decreasing the time it takes to process incoming objects. Long-term historic trends may be used to allocate sorter outputs when the next incoming group of objects is either in-part or entirely unknown. Historical usage patterns provide insight into when objects bound for certain destinations can be expected to arrive, the number of objects bound for each destination expected for any given time, and the probable physical properties of these incoming objects.

The system provides in a specific embodiment an input system that interfaces to the customer's conveyors and containers, stores parcels for feeding into the system, and feeds those parcels into the system at a moderate and controllable rate. In one embodiment, the interface to the customer's process takes the form of a Gaylord dumper, but many other embodiments are possible. In one embodiment, feeding into the system is by an inclined cleated conveyor with overhead baffles. A key to the efficient operation of the system is to feed parcels in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of parcels on the primary conveyor. Where possible the primary perception system may identify the parcel to speed or simplify subsequent operations. For example, knowledge of the parcels on the primary conveyor may enable the system to make better choices on whether to pick up a parcel rather than let it pass to the exception bin, which parcels to pick up first, or on how to allocate output bins. The main job of the primary perception system is to identify and prioritize grasp points. The appropriate methods for choosing grasp points vary with the gripper and with the object. In one embodiment, a vacuum gripper may be in use, and the best grasp point might be a large enough flat spot, with the gripper axis aligned with the surface normal. With other types of grippers other features will be chosen. In accordance with one embodiment, the primary perception system classifies the type of parcel so that the grasping process parameters best suited to that parcel type may be employed.

Figure 14:
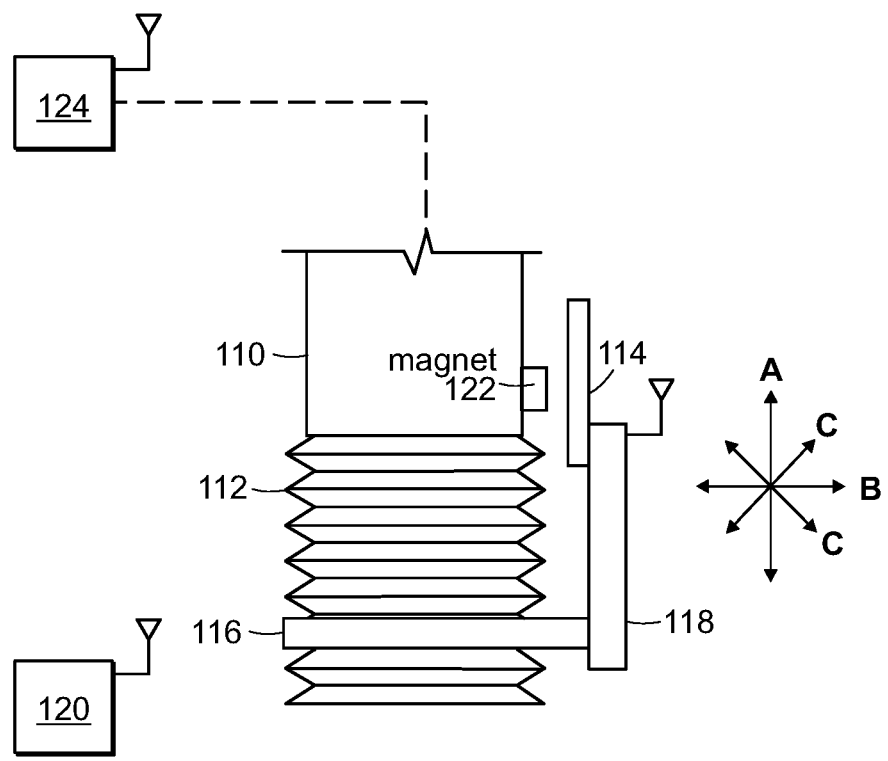
FIG. 14 shows an illustrative diagrammatic view of a gripper that includes a sensor system for use in a system in accordance with an embodiment of the present invention.

As noted above, there are many ways to grasp objects, including vacuum grippers, tongs, enveloping soft grippers, and electrostatic grippers. It is also possible not to use a conventional grasp, and instead to push the parcel across the conveyor, for example, into a perception unit (e.g., unit 28). In one embodiment a vacuum gripper is instrumented with pressure and force sensors, enabling the gripper to detect the onset of grasp, to detect eminent grasp failures, to estimate the quality of a grasp, to estimate the parcel weight and weight distribution, enabling more effective choices in subsequent motion planning. For example, FIG. 14 shows a grasping end effector system for use in accordance with an embodiment of the invention that includes an articulated arm 110 to which is attached an end effector bellows 112, which may be a tubular or conical shaped bellows. The end effector also includes a sensor 114 that includes an attachment band 116 on the bellows, as well as a bracket 118 attached to magnetic field sensor 114, and a magnet 122 that is mounted on the articulated arm 110. The bellows may move in any of three directions, e.g., toward and away from the articulated arm as shown diagrammatically at A, in directions transverse to the direction A as shown at B, and directions partially transverse to the direction A as shown at C. The magnetic field sensor 114 may communicate (e.g., wirelessly) with a controller 120, which may also communicate with a flow monitor 124 to determine whether a high flow grasp of an object is sufficient for continued grasp and transport as discussed further below. In an embodiment, for example, the system may return the object if the air flow is insufficient to carry the load, or may increase the air flow to safely maintain the load.

Figure 15:
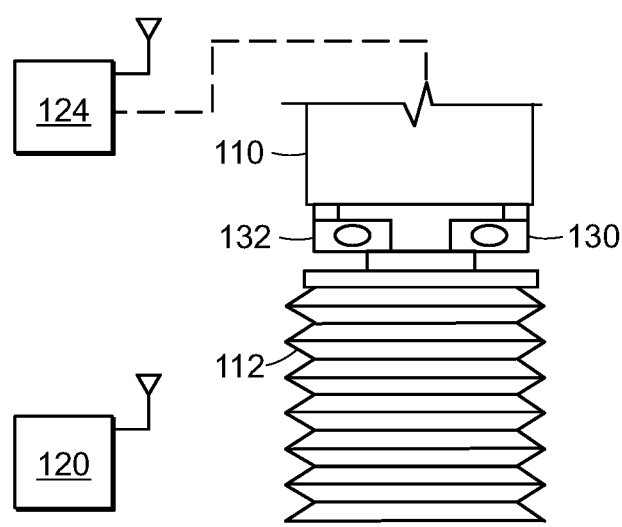
FIG. 15 shows an illustrative diagrammatic view of a sensor system including strain gauges for use in a system in accordance with an embodiment of the present invention.

With reference to FIG. 15, the end effector system in accordance with a further embodiment of the invention may include the articulated arm 110 and a bellows 112, as well as strain gauges 130, 132 (four may be used although two are shown), that couple the end effector to the robotic arm. The strain gauges may be connected to an on-board controller that is in communication with the controller 120, which may also communicate with a flow monitor 124 to determine whether a high flow grasp of an object is sufficient for continued grasp and transport as discussed further below.

In accordance with one embodiment the invention includes a robot arm capable of moving the gripper, along with the grasped parcel, from the initial position on the primary conveyor to a point directly above the drop scanner. Desirable motions should be smooth in order to avoid drops, and fast for overall throughput. In one embodiment the motions are optimized to maintain a good grasp, despite a wide range of parcel types, sizes, weights, and weight distributions. In one embodiment the motion is constrained to prevent shock that may occur when a loosely filled bag becomes taut. In one embodiment the motion is chosen and modulated in real time in accord with evolving estimates of parcel weight, weight distribution, or grasp quality.

For example, in accordance with various embodiments, the invention provides a robotic system that may learn object grasp locations from experience and human guidance. Most robotic systems designed to localize objects and pick them up rely on a suite of sensors to give the system information about the location, size, pose, and even identity of an object. Such systems designed to work in the same environments as human workers will face an enormous variety of objects, poses, etc. The 2D/3D imagery in conjunction with the human-selected grasp points can be used as input to machine learning algorithms, to help the robotic system learn how to deal with such cases in the future, thereby reducing the need for operator assistance over time. A combination of 2D and 3D (depth) data is acquired, the system uses this imagery and a variety of algorithms to generate a set of candidate grasp points for the objects in the bin.

In addition to geometric information the system may learn the location of fiducial markers such as barcodes on the object, which can be used as indicator for a surface patch that is flat and impermeable, hence suitable for a suction cup. One such example is shipping boxes and bags, which tend to have the shipping label at the object's center of mass and provide an impermeable surface, as opposed to the raw bag material which might be slightly porous and hence not present a good grasp. In accordance with further examples, the fiducial marker itself may not be the target, but may provide a reference for finding a target grasp location. Once a product is identified and its orientation is known for example, a certain distance (e.g., x, y) from a fiducial marker may be used as an optimal grasp location.

The robotic system may employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task.

Figure 16:
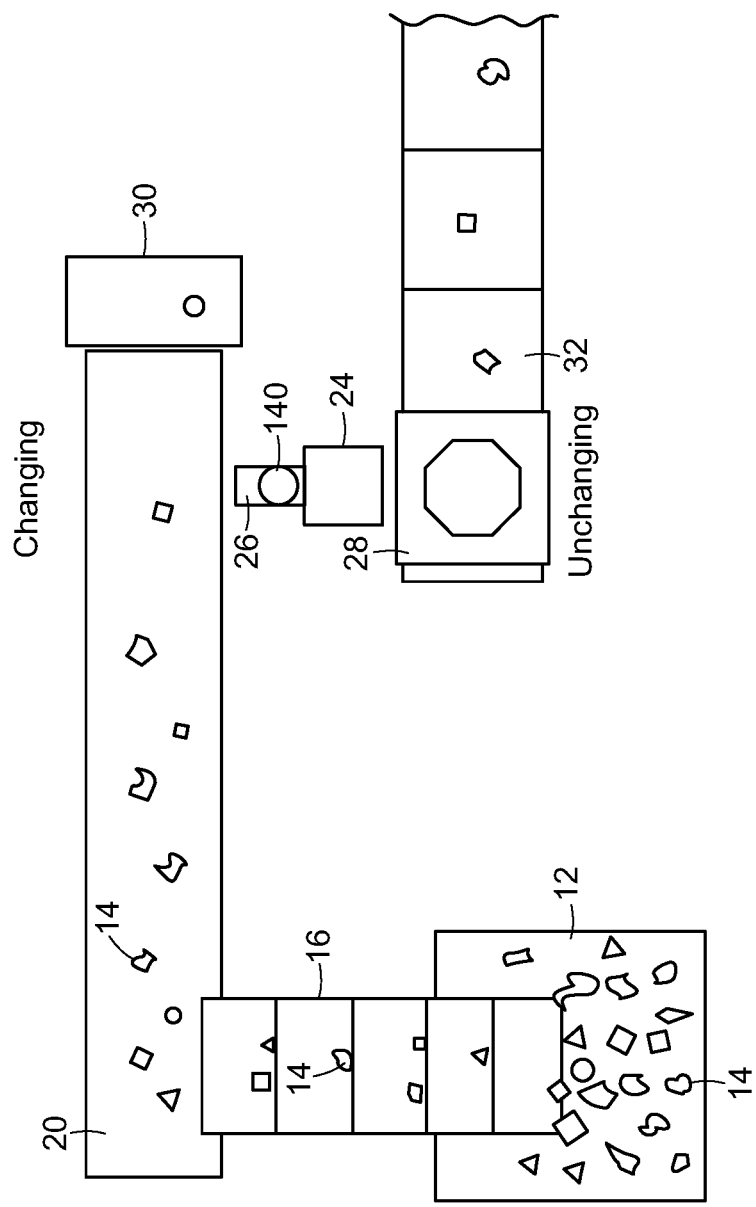
FIG. 16 shows an illustrative diagrammatic top view of a portion of a system in accordance with an embodiment of the present invention.

FIG. 16 for example, shows a diagrammatic view of a robotic sortation system that includes a primary conveyor 20 for providing objects 14 from an input hopper 12 via a cleated conveyor 16 as discussed above. The primary conveyor 20 provides the objects to a robot access area, where the robot 24 including an end effector 26 may engage the objects and provide them to a secondary perception system 28 (e.g., a drop scanner). The primary perception system (22 of FIG. 1) is not shown for clarity. The scanned objects are then dropped to the secondary conveyor 32 as discussed above.

The robotic system may include a defined home or base location 140 to which each object may initially be brought upon acquisition from the primary conveyor. The trajectories taken by the articulated arm of the robot system from the conveyor to the base location 140 are constantly changing based in part, on the location of each object on the conveyor, the orientation of the object on the conveyor, and the shape, weight and other physical properties of the object to be acquired.

Once the articulated arm has acquired an object and is positioned at the base location, the paths to the drop scanner are not changing. For a trajectory that is not changing, the shortest distance is a direct path to the target processing or destination bin, but the articulated arm is comprised of articulated sections, joints, motors etc. that provide specific ranges of motion, speeds, accelerations and decelerations. Because of this, the robotic system may take any of a variety of trajectories between, for example, base location 140 and the drop scanner 28.

As also discussed above, the system includes in a specific embodiment a drop scanner that scans objects dropped through it, reads bar codes, confirms that an object is correctly singulated, and obtains the desired processing bin. Other embodiments are possible, including use of a conventional scan tunnel, or relying entirely on primary perception to identify objects. Another embodiment would include a recirculating primary conveyor, in which objects not identified on the first pass might be recirculated, perhaps by falling back into the infeed.

Figure 17:
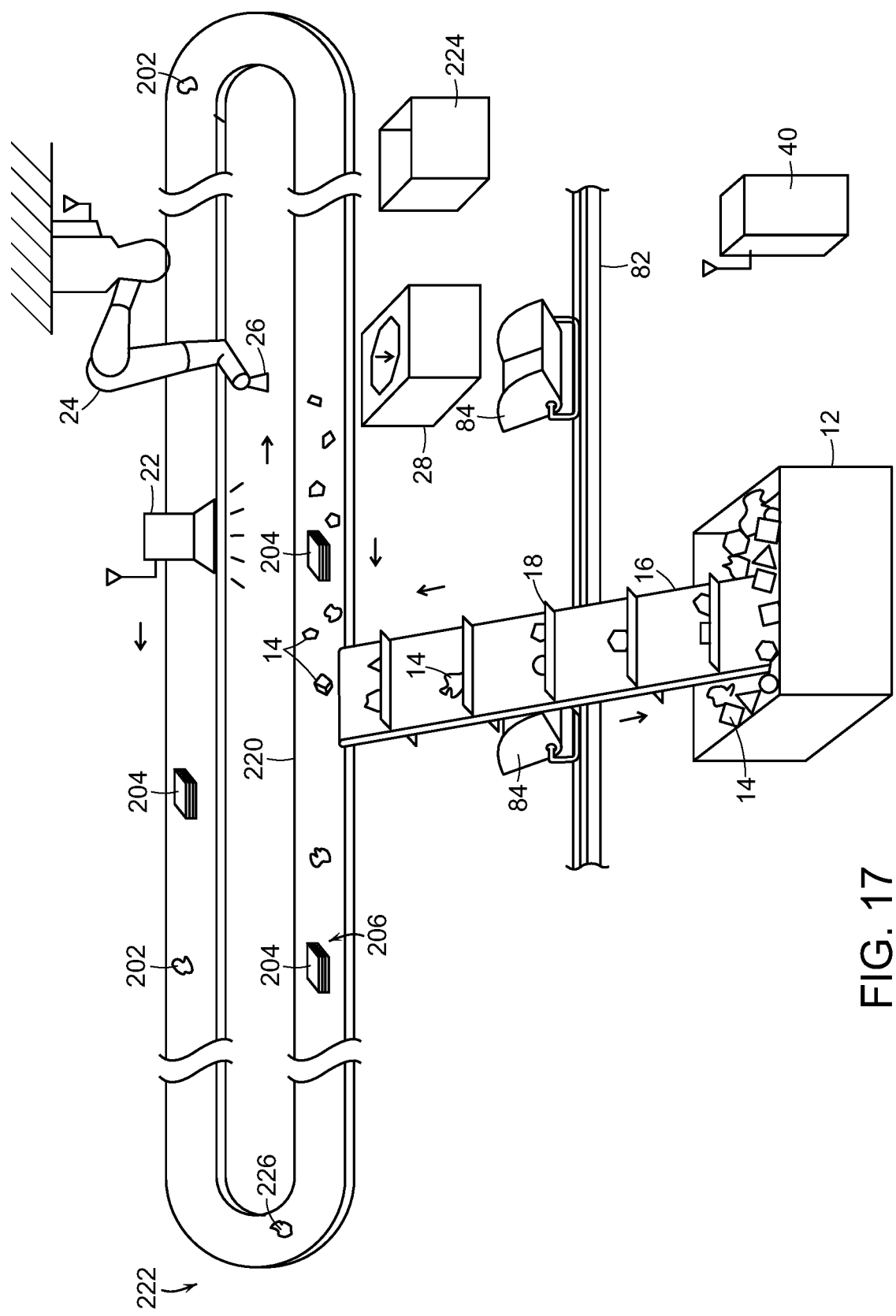
FIG. 17 shows an illustrative diagrammatic view of a system in accordance with an embodiment of the present invention that includes a circular conveyor.
Figure 18:
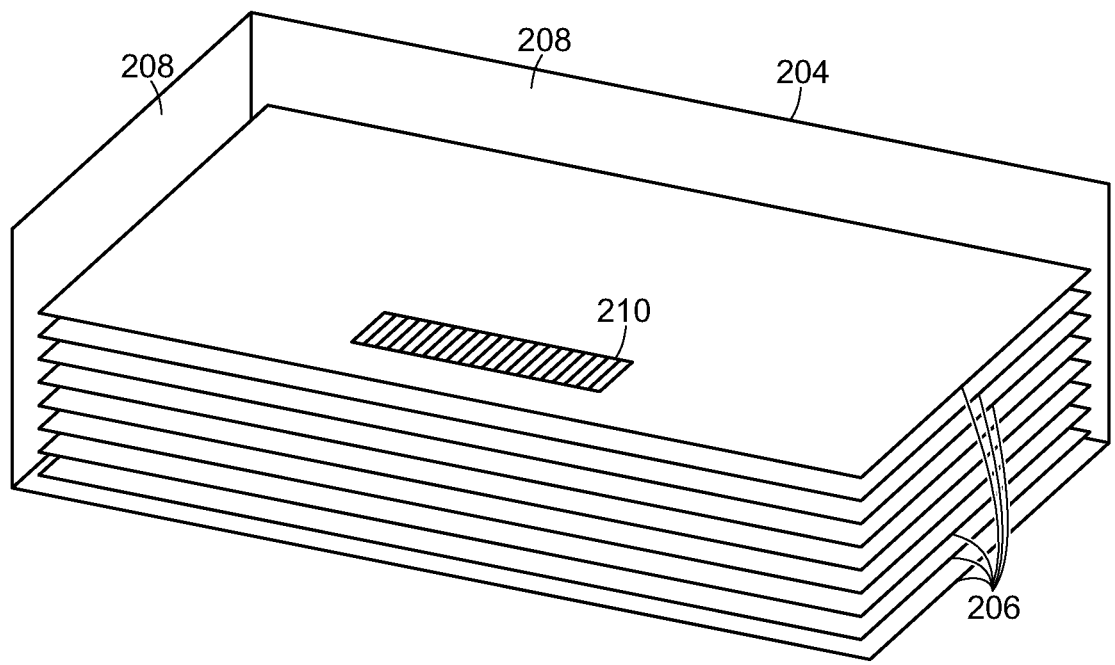
FIG. 18 shows an illustrative diagrammatic view of a flat item carrier for use in a system in accordance with an embodiment of the present invention.

FIG. 17 shows a system in accordance with a further embodiment of the invention that is similar to that of FIG. 8 (and wherein common reference numerals reference common items), except that the conveyor 220 is provided as a circular conveyor, providing that the objects (e.g., 202) may remain on the conveyor once placed thereon. The system may also include flat item carriers 204 for holding flat items 206 as shown in FIG. 18. Certain detection systems using the primary perception system 22 may have difficulty detecting the presence on the conveyor of a solitary flat item, such as an envelope. Such flat items may also have difficulty being drawn up the infeed conveyor 16. In accordance with certain embodiments therefore, flat item carriers 204 may be used, and such flat items 206 may be stacked on a carrier 204 as shown in FIG. 18, for example, against a pair of adjoining walls 208. A human may provide this stacking, and may place the carrier(s) onto the conveyor 220 at a station 222.

Figure 19:
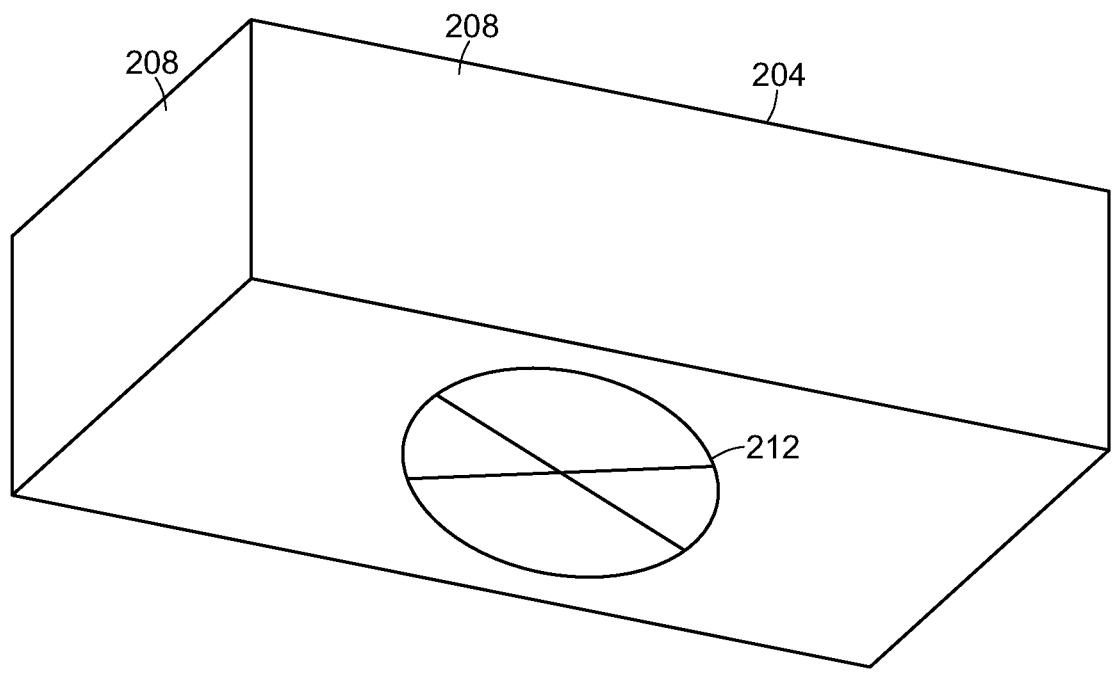
FIG. 19 shows an illustrative diagrammatic view of the flat item carrier of FIG. 17 shown empty.

When the flat item carrier 204 comes into view of the primary perception system, the walls 208 of the carrier 204 should aid in detection, and the system will identify the object by indicia 210, and grasp the top object on the stack. Each time the carrier travels around the conveyor 220, another top object is removed and processed. When the carrier is empty (as shown in FIG. 19), a unique symbol 212 at the bottom of the carrier 204 may indicate to the system that the carrier is empty, and empty carriers so identified may be removed by the end effector 26 and dropped into an empty carrier bin 224. Empty carriers may also be removed by a human, e.g., at station 222, and any non-processable objects 226 may be so removed as well.

Figure 20:
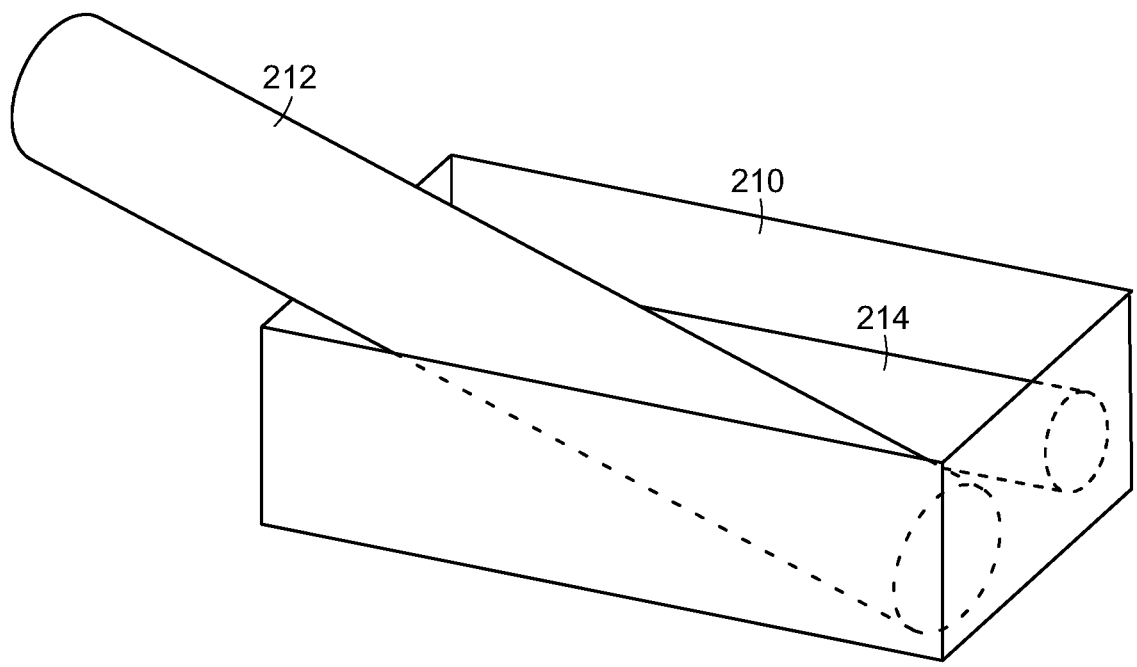
FIG. 20 shows an illustrative diagrammatic view of a tubular item carrier for use in a system in accordance with an embodiment of the present invention.
Figure 21:
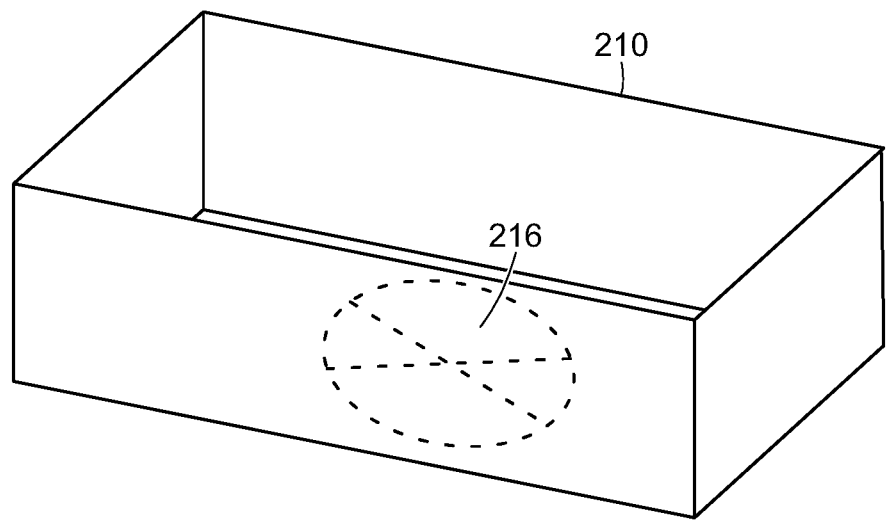
FIG. 21 shows an illustrative diagrammatic view of the tubular item carrier of FIG. 20 shown empty.

FIGS. 20 and 21 show a carrier 210 for handling cylindrical items 212, 214, which may either fit within the carrier 210, or may stick out of the carrier 210. Either way, the carrier 210 may maintain the cylindrical item on the conveyor 20. The carrier 210 may also include unique symbol 216 similar to the symbol 212 in FIG. 19 for communicating to the system that the carrier is empty, and may be processed as discussed above. In such a system, if a conveyor such as 32 shown in FIG. 1 is used, guide walls may be positioned along the conveyor 32.

The systems therefore, include in certain embodiments a primary transport system that transports singulated and identified parcels towards the output. In one embodiment the primary transport is a conveyor belt with dividers to preserve singulation. The conveyor belt is indexed one position at a time, positioning parcels for transfer to a secondary transport system. Parcels are transferred by a diverter which pushes them across the conveyor to the secondary transport. When a singulation or identification failure occurs, the parcel remains on secondary transport and falls into the secondary exception bin. Other embodiments are possible, for example a cross-belt system, a sliding shoe diverter system, or a tilt-tray system.

The system also includes in a specific embodiment a secondary transport system which carries parcels to the processing bins. In embodiment the secondary transport is a reciprocating shuttle which travels linearly along the tops of two rows of bins, then tilts to one side or the other to drop the parcel into the desired bin, and then returns to a home position ready to receive another parcel. Other embodiments are possible, for example a tilt-tray system, a cross-belt system, or a shoe diverter system.

The system includes means to interface to the customer's outgoing parcel conveyance systems. In a specific embodiment the bins are lined with bags. When the bin is full as determined by sensors or by monitoring system operation, a human operator pulls the bin out of place, removes the bag, labels the bag, and places the bag on an appropriate conveyor. Other embodiments are possible, including automatic bagging systems, bins without bags, and bins that are automatically ejected from the system and replaced with new bins. In one embodiment the system continues operation during the bagging operation by avoiding induction of parcels destined for that particular bin, or by allocating a different bin for the same destination.

In accordance with a specific embodiment, the invention provides a user interface that conveys all relevant information to operators, management, and maintenance personnel. In a specific embodiment this may include lights indicating bins that should be bagged, lights indicating bins not completely returned to position, lights indicating operational status, displays for monitoring the operation of the primary perception system and the drop scanner, displays monitoring grasping and robot motion, monitoring of exception bin levels and input hopper level, and operating mode of the entire system. Additional information included might be rate of parcel processing and additional statistics such as exception and error rates. In a specific embodiment the system automatically prints bag labels and scans bag labels before the operator places them on the output conveyor.

In accordance with a further embodiment, a system of the invention incorporates software systems that interface with the customer's databases and other information systems, to provide operational information to the customer's system and to query the customer's system for parcel information.

The invention has many variations possible to suit the varying characteristics of the task. The number of bins serviced by a shuttle may be greater or lesser. The number of shuttles may be increased. In some embodiments there may be more than one secondary transport system, serving additional sets of shuttles. In other embodiments there may be more than one robot.

Some applications may not justify the use of a robot, and one embodiment would then use a human to perform induction. In another embodiment, the system might include a conventional unit sortation conveyor such as a tilt-tray or cross belt sorter, with the robot performing induction.

In accordance with various embodiments, therefore, the invention provides a robotic system for sorting parcels to desired output destination bins. The system includes an input system for accepting parcels from the customer and feeding them into the system; a singulation system to transform the stream of parcels into a sequence of discrete parcels; an identification system to read identifying marks or otherwise determine the desired destination; and an output system for conveying each parcel to a desired processing bin, from which it can be conveyed to the customer's desired destination.

In further embodiments, the infeed system includes an inclined conveyor with cleats, the infeed system includes an inclined conveyor with baffles, and/or the infeed system includes a sensor to monitor parcel stream height, breadth or rate, so that the conveyor rate may be modulated to control parcel rate. In accordance with further embodiments, the singulation system includes a primary perception system to monitor parcels.

In accordance with certain embodiments, the primary perception system may determine parcel identity, may determine grasp locations, and/or may determine parcel class. In accordance with further embodiments, the singulation system may include one or more robotic manipulators with grippers, and one or more of the grippers is a vacuum gripper, the vacuum gripper may be equipped with a pressure sensor, and/or one or more of the grippers may be equipped with a force sensor. In accordance with further embodiments, the singulation system may include one or more robotic manipulators with end effectors suited to pushing, and the identification system may include one or more parcel scanners to identify parcels, e.g., a drop scanner.

In accordance with certain embodiments, the output system includes one or more conveyors which combine to transfer parcels to bins, the conveyors are organized as one or more primary conveyors; with each primary conveyor transferring parcels to one or more secondary conveyors, and/or one or more primary conveyors is a cleated conveyor capable of indexing one position at a time. In accordance with further embodiments, diverters transfer parcels from the primary conveyors to secondary conveyors, the diverters are linear actuators attached to sweeper diverters, one or more of the conveyors is a reciprocating shuttle, and/or the reciprocating shuttle includes a tilt axis to drop parcels.

In accordance with further embodiments, the invention provides a method for automatically sorting parcels and conveying parcels to desired output destinations. The method includes the steps of feeding the customer parcels into the system infeed, conveying the parcels from the system infeed to a singulation system, singulating the parcels and moving them to an identification system, identifying the parcels and their associated desired destinations, and conveying each parcel to a desired destination.

In accordance with further embodiments, the infeed conveyor's design and control are optimized to present the parcels in a stream best suited to subsequent perception and handling, grasp points are determined automatically, grasp points are determined from computer vision algorithms, and/or singulation is accomplished by grasping single parcels and moving them individually to subsequent processing. In accordance with further embodiments, sensor information is used to estimate grasp state including contact with parcel, quality of vacuum seal, parcel weight, parcel mass distribution, and parcel position relative to gripper, and/or grasp state estimates are used to determine whether the grasp is adequate, and to modulate the subsequent motion to avoid drops. In accordance with further embodiments, the robot arm's motion is determined by motion planning software cognizant of initial and final waypoints, surrounding obstacles, and constraints necessary to maintain a secure grasp and/or the correspondence of output bins to customer destinations are determined dynamically to optimize system throughput.

Those skilled in the art will appreciate that numerous modifications and variations may be made to the above disclosed embodiments without departing from the spirit and scope of the present invention.

What is claimed is:

1. A system for processing objects, said system comprising:
an input transport system including a first conveyor that transports a disorganized stream of objects from an input bin along a first direction to a second conveyor;
a singulation system including a robotic arm having an end effector that selectively provides a singulated stream of objects on the second conveyor for transport along a second direction that is at least in part orthogonal to the first direction;
a perception system including a housing defining a top opening and a bottom opening through which the singulated stream of objects are dropped from an end of the second conveyor, and a plurality of perception units directed towards a hollow interior of the housing that generate perception data regarding each object dropped through the hollow interior of the housing; and
a distribution transport system for transporting the singulated stream of objects in a third direction that is generally parallel with the second direction for distribution to any of a plurality of destination locations responsive to the perception data.

2. The system as claimed in claim 1, wherein the second conveyor is a cleated conveyor.

3. The system as claimed in claim 2, wherein one object is provided in each cleated area of the cleated conveyor.

4. The system as claimed in claim 1, wherein the singulated stream of objects is provided on the second conveyor without dividers between the objects.

5. The system as claimed in claim 1, where the singulated stream of objects is provided on the distribution transport system in a plurality of carriers.

6. The system as claimed in claim 5, wherein one object is provided in each of the plurality of carriers.

7. The system as claimed in claim 1, wherein at least one perception unit among the plurality of perception units is a camera.

8. The system as claimed in claim 1, wherein at least one perception unit among the plurality of perception units is a code scanner.

9. The system as claimed in claim 1, wherein at least one perception unit among the plurality of perception units is a radio-frequency identification (RFID) tag scanner.

10. The system as claimed in claim 1, wherein the distribution transport system includes at least one diverter unit for diverting objects from the distribution transport system.

11. The system as claimed in claim 1, wherein the distribution transport system includes a cleated conveyor.

12. The system as claimed in claim 1, wherein the distribution transport system includes a plurality of diverters for urging objects in directions that are generally transverse to the third direction.

13. The system as claimed in claim 1, wherein the distribution transport system includes a plurality of actuatable carriages.

14. The system as claimed in claim 1, wherein the distribution transport system includes a plurality of shuttle wings including the plurality of destination locations into which objects are directed based on the perception data.

15. The system as claimed in claim 14, wherein each of the plurality of shuttle wings includes a reciprocating carriage.

16. The system as claimed in claim 15, wherein each of the reciprocating carriages is actuated to drop a selected object into a desired destination location of the plurality of destination locations.

17. A system for processing objects, said system comprising:
an input transport system including a first conveyor that transports a disorganized stream of objects from an input bin along a first direction to a second conveyor;

a singulation system including a robotic arm having an end effector that selectively provides a singulated stream of objects to a perception system, said perception system for receiving the singulated stream of objects, said perception system including at least one perception unit that generates perception data regarding each object in the singulated stream of objects received from the second conveyor; and a distribution transport system for transporting the singulated stream of objects in a third direction that is generally parallel with the second conveyor for distribution to any of a plurality of destination locations responsive to the perception data, each of the plurality of destination locations being provided as a set of destination locations adjacent a reciprocating carriage for receiving objects.

18. The system as claimed in claim 17, wherein the second conveyor is a cleated conveyor.

19. The system as claimed in claim 18, wherein one object is provided in each cleated area of the cleated conveyor.

20. The system as claimed in claim 17, wherein the singulated stream of objects is provided on the second conveyor without dividers between the objects.

21. The system as claimed in claim 17, where the singulated stream of objects is provided on the distribution transport system in a plurality of carriers.

22. The system as claimed in claim 21, wherein one object is provided in each of the plurality of carriers.

23. The system as claimed in claim 17, wherein the perception system includes a housing defining a top opening and a bottom opening through which the singulated stream of objects are dropped from an end of the second conveyor, and a plurality of perception units directed towards a hollow interior of the housing that generate perception data regarding each object dropped through the hollow interior of the housing.

24. The system as claimed in claim 23, wherein the at least one perception unit is a camera.

25. The system as claimed in claim 23, wherein the at least one perception unit is a code scanner.

26. The system as claimed in claim 23, wherein the at least one perception unit is a radio-frequency identification (RFID) tag scanner.

27. The system as claimed in claim 17, wherein the distribution transport system includes at least one diverter unit for diverting objects from the distribution transport system.

28. The system as claimed in claim 17, wherein the distribution transport system includes a cleated conveyor.

29. The system as claimed in claim 17, wherein the distribution transport system includes a plurality of diverters for urging objects in directions that are generally transverse to the third direction.

30. The system as claimed in claim 17, wherein the distribution transport system includes a plurality of actuatable carriages.

31. The system as claimed in claim 17, wherein each set of the destination locations adjacent the reciprocating carriage is provided as part of one of a plurality of shuttle wings including a pair of sets of a plurality of destination locations into which objects are directed based on the perception data.

32. The system as claimed in claim 31, wherein each of the plurality of shuttle wings includes the reciprocating carriage.

33. The system as claimed in claim 32, wherein each of the reciprocating carriages is actuated to drop a selected object into a desired destination location of the plurality of destination locations.

34. A method of processing objects, said method comprising:

transporting objects along a first conveyor that transports a disorganized stream of objects from an input bin along a first direction to a second conveyor;

using a robotic arm having an end effector to selectively provide a singulated stream of objects on the second conveyor for transport along a second direction that is at least in part orthogonal to the first direction;

dropping the singulated stream of objects, one object at a time, from an end of the second conveyor through a perception system, the perception system including a housing that defines a top opening and a bottom opening, the perception system further including a plurality of perception units directed towards a hollow interior of the housing;

generating perception data regarding each object in the singulated stream of objects dropped through the hollow interior of the housing of the perception system by the plurality of perception units; and transporting the singulated stream of objects in a third direction that is generally parallel with the second direction for distribution to any of a plurality of destination locations responsive to the perception data.

35. The method as claimed in claim 34, wherein the second conveyor is a cleated conveyor.

36. The method as claimed in claim 35, wherein one object is provided in each cleated area of the cleated conveyor.

37. The method as claimed in claim 34, wherein the singulated stream of objects is provided on the second conveyor without dividers between the objects.

38. The method as claimed in claim 34, wherein transporting the singulated stream of objects in the third direction that is generally parallel with the second direction for distribution to any of the plurality of destination locations comprises transporting the singulated stream of objects in a plurality of carriers.

39. The method as claimed in claim 38, wherein one object is provided in each of the plurality of carriers.

40. The method as claimed in claim 34, wherein the plurality of perception units includes at least one camera.

41. The method as claimed in claim 34, wherein the plurality of perception units includes at least one code scanner.

42. The method as claimed in claim 34, wherein the plurality of perception units includes at least one radio-frequency identification (RFID) tag scanner.

43. The method as claimed in claim 34, wherein the method further includes diverting objects to any of the plurality of destination locations.

44. The method as claimed in claim 34, wherein the method further includes urging objects in directions that are generally transverse to the third direction.

45. The method as claimed in claim 34, wherein the method further includes providing a plurality of shuttle wings including the plurality of destination locations into which objects are directed based on the perception data.

46. The method as claimed in claim 45, wherein each of the plurality of shuttle wings includes a reciprocating carriage.

47. The method as claimed in claim 46, wherein each of the reciprocating carriages is actuated to drop a selected object into a desired destination location of the plurality of destination locations.

48. A system for processing objects, said system comprising:
an input transport system including a first conveyor that transports a disorganized stream of objects from an input bin along a first direction to a second conveyor;
a singulation system including a robotic arm having an end effector that selectively provides a singulated stream of objects on the second conveyor for transport along a second direction that is at least in part orthogonal to the first direction;
a perception system including at least one perception unit that generates perception data regarding each object in the singulated stream of objects received from the second conveyor; and
a distribution transport system for transporting the singulated stream of objects in a third direction that is generally parallel with the second direction for distribution to any of a plurality of destination locations responsive to the perception data, wherein the distribution transport system includes a plurality of shuttle wings including the plurality of destination locations into which each object in the singulated stream of objects are directed based on the perception data.

49. The system as claimed in claim 48, wherein the second conveyor is a cleated conveyor.

50. The system as claimed in claim 49, wherein one object is provided in each cleated area of the cleated conveyor.

51. The system as claimed in claim 48, wherein the singulated stream of objects is provided on the second conveyor without dividers between the objects.

52. The system as claimed in claim 48, where the singulated stream of objects is provided on the distribution transport system in a plurality of carriers.

53. The system as claimed in claim 52, wherein one object is provided in each of the plurality of carriers.

54. The system as claimed in claim 48, wherein the perception system includes a housing defining a top opening and a bottom opening through which the singulated stream of objects are dropped from an end of the second conveyor, and the at least one perception unit is provided among a plurality of perception units directed towards a hollow interior of the housing that generate perception data regarding each object dropped through the hollow interior of the housing.

55. The system as claimed in claim 54, wherein the least one perception unit among the plurality of perception units is a camera.

56. The system as claimed in claim 54, wherein the at least one perception unit among the plurality of perception units is a code scanner.

57. The system as claimed in claim 54, wherein the at least one perception unit among the plurality of perception units is a radio-frequency identification (RFID) tag scanner.

58. The system as claimed in claim 48, wherein the distribution transport system includes at least one diverter unit for diverting objects from the distribution transport system.

59. The system as claimed in claim 48, wherein the distribution transport system includes a cleated conveyor.

60. The system as claimed in claim 48, wherein the distribution transport system includes a plurality of diverters for urging objects in directions that are generally transverse to the third direction.

61. The system as claimed in claim 48, wherein the distribution transport system includes a plurality of actuatable carriages.

62. The system as claimed in claim 48, wherein each of the plurality of shuttle wings includes a reciprocating carriage.

63. The system as claimed in claim 62, wherein each of the reciprocating carriages is actuatable to drop a selected object into a desired destination location of the plurality of destination locations.

64. A method of processing objects, said method comprising:
transporting objects along a first conveyor that transports a disorganized stream of objects from an input bin along a first direction to a second conveyor;
using a robotic arm having an end effector to selectively provide a singulated stream of objects on the second conveyor for transport along a second direction that is at least in part orthogonal to the first direction;
generating perception data regarding each object in the singulated stream of objects received from the second conveyor;
transporting the singulated stream of objects in a third direction that is generally parallel with the second direction to any of a plurality of shuttle wings, each of the plurality of shuttle wings including a reciprocating carriage that distributes each object to any of a plurality of destination locations within the shuttle wing responsive to the perception data.

65. The method as claimed in claim 64, wherein the second conveyor is a cleated conveyor.

66. The method as claimed in claim 65, wherein one object is provided in each cleated area of the cleated conveyor.

67. The method as claimed in claim 64, wherein the singulated stream of objects is provided on the second conveyor without dividers between the objects.

68. The method as claimed in claim 64, wherein transporting the singulated stream of objects in the third direction that is generally parallel with the second direction for distribution to any of the plurality of destination locations comprises transporting the singulated stream of objects in a plurality of carriers.

69. The method as claimed in claim 68, wherein one object is provided in each of the plurality of carriers.

70. The method as claimed in claim 64, wherein the generating perception data includes dropping the object through a perception system with a housing defining a top opening and a bottom opening through which the singulated stream of objects are dropped from an end of the second conveyor, and a plurality of perception units directed towards a hollow interior of the housing that generate perception data regarding each object dropped through the hollow interior of the housing.

71. The method as claimed in claim 70, wherein at least one perception unit among the plurality of perception units is a camera.

72. The method as claimed in claim 70, wherein at least one perception unit among the plurality of perception units is a code scanner.

73. The method as claimed in claim 70, wherein at least one perception unit among the plurality of perception units is a radio-frequency identification (RFID) tag scanner.

74. The method as claimed in claim 64, wherein the method further includes diverting objects to any of the plurality of destination locations.

75. The method as claimed in claim 64, wherein the method further includes urging objects in directions that are generally transverse to the third direction.

76. The method as claimed in claim 64, wherein each of the reciprocating carriages is actuated to drop a selected object into a desired destination location of the plurality of destination locations.

* * * * *

UNITED STATES PATENT AND TRADEMARK OFFICE
CERTIFICATE OF CORRECTION

| | |
|---|---|
| PATENT NO. | : 11,780,684 B2 |
| APPLICATION NO. | : 16/995015 |
| DATED | : October 10, 2023 |
| INVENTOR(S) | : Thomas Wagner et al. |

It is certified that error appears in the above-identified patent and that said Letters Patent is hereby corrected as shown below:

In the Claims

In Claim 55, Column 21, Line 49, should read:
"The system as claimed in claim 54, wherein the at least"

In Claim 64, Column 22, Line 23, should read:
"conveyor; and"

Signed and Sealed this
Twenty-first Day of November, 2023

Katherine Kelly Vidal
*Director of the United States Patent and Trademark Office*